(12) United States Patent
Yawata et al.

(10) Patent No.: US 12,107,212 B2
(45) Date of Patent: Oct. 1, 2024

(54) NEGATIVE ELECTRODE COMPOSITION, NEGATIVE ELECTRODE SHEET FOR ALL-SOLID STATE SECONDARY BATTERY, ALL-SOLID STATE SECONDARY BATTERY, METHOD FOR MANUFACTURING NEGATIVE ELECTRODE SHEET FOR ALL-SOLID STATE SECONDARY BATTERY, AND METHOD FOR MANUFACTURING ALL-SOLID STATE SECONDARY BATTERY

(71) Applicant: FUJIFILM Corporation, Tokyo (JP)

(72) Inventors: Toshihiko Yawata, Kanagawa (JP); Shin Ozawa, Kanagawa (JP); Hideyuki Suzuki, Kanagawa (JP); Hiroshi Isojima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 797 days.

(21) Appl. No.: 17/183,365

(22) Filed: Feb. 24, 2021

(65) Prior Publication Data
US 2021/0184252 A1 Jun. 17, 2021

Related U.S. Application Data

(63) Continuation of application No. PCT/JP2019/037251, filed on Sep. 24, 2019.

(30) Foreign Application Priority Data

Sep. 28, 2018 (JP) .................. 2018-184891

(51) Int. Cl.
*H01M 10/0562* (2010.01)
*H01M 4/02* (2006.01)
(Continued)

(52) U.S. Cl.
CPC ....... *H01M 10/0562* (2013.01); *H01M 4/136* (2013.01); *H01M 4/1397* (2013.01);
(Continued)

(58) Field of Classification Search
CPC ......... H01M 10/0562–0585; H01M 2004/027; H01M 2300/0068; H01M 4/136; H01M 4/1397; Y02E 60/10; Y02P 70/50
See application file for complete search history.

(56) References Cited

U.S. PATENT DOCUMENTS

| 6,368,746 B1 | 4/2002 | Takada et al. |
| 2014/0120427 A1 | 5/2014 | Suyama et al. |
| 2019/0267617 A1* | 8/2019 | Evans et al. ............ H01M 4/36 |

FOREIGN PATENT DOCUMENTS

| JP | 2000123874 | 4/2000 |
| JP | 2016139511 | 8/2016 |

(Continued)

OTHER PUBLICATIONS

Makino, JP 2016181448 A, EPO machine translation, 2016 (Year: 2016).*

(Continued)

*Primary Examiner* — Haroon S. Sheikh
*Assistant Examiner* — Kan Luo
(74) *Attorney, Agent, or Firm* — JCIPRNET

(57) ABSTRACT

Provided are a negative electrode composition including a sulfide-based inorganic solid electrolyte, a negative electrode active material containing a silicon atom or a tin atom, and a polymer, in which the polymer has substantially no adsorption capacity to the negative electrode active material and the sulfide-based inorganic solid electrolyte, a modulus of elasticity of the polymer measured in accordance with JIS K 7161 (2014) is 100 MPa or higher and 1000 MPa or lower, and in a case where a negative electrode active material layer
(Continued)

is formed of the negative electrode composition, the polymer is contained in the negative electrode active material layer in a particle form, a negative electrode sheet for an all-solid state secondary battery, an all-solid state secondary battery, a method for manufacturing a negative electrode sheet for an all-solid state secondary battery, and a method for manufacturing an all-solid state secondary battery.

13 Claims, 1 Drawing Sheet

(51) Int. Cl.
*H01M 4/136* (2010.01)
*H01M 4/1397* (2010.01)

(52) U.S. Cl.
CPC ............... *H01M 2004/027* (2013.01); *H01M 2300/0068* (2013.01)

(56) References Cited

FOREIGN PATENT DOCUMENTS

| | | | |
|---|---|---|---|
| JP | 2016149238 | | 8/2016 |
| JP | 2016181448 A | * | 10/2016 ............... H01B 1/20 |
| WO | 2013001623 | | 1/2013 |

OTHER PUBLICATIONS

Mochizuki, JP 2016149238 A, EPO machine translation, 2016 (Year: 2016).*
"International Search Report (Form PCT/ISA/210) of PCT/JP2019/037251" mailed on Nov. 26, 2019, with English translation thereof, pp. 1-5.
"International Preliminary Report On Patentability (Form PCT/IPEA/409) of PCT/JP2019/037251" completed on May 27, 2020, with English translation thereof, pp. 1-8.

* cited by examiner

NEGATIVE ELECTRODE COMPOSITION, NEGATIVE ELECTRODE SHEET FOR ALL-SOLID STATE SECONDARY BATTERY, ALL-SOLID STATE SECONDARY BATTERY, METHOD FOR MANUFACTURING NEGATIVE ELECTRODE SHEET FOR ALL-SOLID STATE SECONDARY BATTERY, AND METHOD FOR MANUFACTURING ALL-SOLID STATE SECONDARY BATTERY

CROSS-REFERENCE TO RELATED APPLICATIONS

This application is a Continuation of PCT International Application No. PCT/JP2019/037251 filed on Sep. 24, 2019, which claims priority under 35 U.S.C. § 119 (a) to Japanese Patent Application No. 2018-184891 filed in Japan on Sep. 28, 2018. Each of the above applications is hereby expressly incorporated by reference, in its entirety, into the present application.

BACKGROUND OF THE INVENTION

1. Field of the Invention

The present invention relates to a negative electrode composition, a negative electrode sheet for an all-solid state secondary battery, an all-solid state secondary battery, and a method for manufacturing a negative electrode sheet for an all-solid state secondary battery and an all-solid state secondary battery.

2. Description of the Related Art

A lithium ion secondary battery is a storage battery which has a negative electrode, a positive electrode, and an electrolyte sandwiched between the negative electrode and the positive electrode and enables charging and discharging by reciprocal migration of lithium ions between both electrodes. In the related art, an organic electrolytic solution has been used in a lithium ion secondary battery as an electrolyte. However, the organic electrolytic solution is likely to leak, and a short circuit may occur in the battery due to overcharging or overdischarging so as to cause ignition. Therefore, further improvement in safety and reliability is required.

Under such circumstances, an all-solid state secondary battery formed of an inorganic solid electrolyte instead of an organic electrolytic solution has attracted attention. The negative electrode, the electrolyte, and the positive electrode of the all-solid state secondary battery are all made of solid, and thus safety or reliability of a battery formed of an organic electrolytic solution can be greatly improved.

In the all-solid state secondary battery, materials containing an inorganic solid electrolyte, an active material, a polymer, and the like are proposed as materials for forming a layer (constituent layer) constituting an all-solid state secondary battery, such as a negative electrode active material layer, a solid electrolyte layer, and a positive electrode active material layer.

For example, in JP2016-139511A, solid electrolyte compositions containing an inorganic solid electrolyte having ion conductivity of metals belonging to Group I or II of the periodic table, polymer particles, and a dispersion medium containing a solvent that dissolves the polymer particles and a solvent that does not dissolve the polymer particles are described.

SUMMARY OF THE INVENTION

It is described in JP2016-139511A that various negative electrode active materials can be used. In a negative electrode active material layer of an all-solid state secondary battery, a volume of the negative electrode active material changes due to expansion and contraction during charging and discharging, which may cause gaps between solid particles, and may deteriorate battery performance such as cycle characteristics. In the all-solid state secondary battery produced by using a solid electrolyte composition containing the negative electrode active material described in JP2016-139511A, it is considered that the polymer particles are adsorbed to the solid particles to suppress the occurrence of the gaps between solid particles due to the volume change in the negative electrode active material.

Among the negative electrode active materials, a negative electrode active material containing silicon atoms or tin atoms can occlude more Li ions than a negative electrode active material such as graphite or acetylene black. Therefore, a battery capacity can be increased. However, the volume change due to expansion and contraction during charging and discharging is large as the battery capacity increases, and the cycle characteristics are deteriorated.

An object of the present invention is to provide a negative electrode composition capable of realizing an all-solid state secondary battery which has low resistance and a discharge capacity that is less likely to be lowered even though charging and discharging are repeated (excellent cycle characteristics are provided), by using the negative electrode composition as a material for forming a negative electrode active material layer that includes a negative electrode active material containing a silicon atom or a tin atom. Another object of the present invention is to provide a negative electrode sheet for an all-solid state secondary battery and an all-solid state secondary battery each of which includes a negative electrode active material layer formed of the negative electrode composition. Still another object of the present invention is to provide a method for manufacturing the above described negative electrode sheet for an all-solid state secondary battery, and a method for manufacturing the above described all-solid state secondary battery.

As a result of carrying out various studies, the present inventors have found that a negative electrode composition is prepared by combining a polymer that has substantially no adsorption capacity to a negative electrode active material containing a silicon atom or a tin atom, also has substantially no adsorption capacity to a sulfide-based inorganic solid electrolyte, and has a specific modulus of elasticity with the negative electrode active material and sulfide-based inorganic solid electrolyte, and a negative electrode active material layer of an all-solid state secondary battery is formed by using the negative electrode composition to allow the polymer to exist in the layer in a particle form, so that the obtained all-solid state secondary battery has characteristics of low resistance and a discharge capacity that is less likely to be lowered even though charging and discharging are repeated. The present invention was completed by repeating additional studies based on the above described findings.

That is, the above described objects have been achieved by the following means.

<1> A negative electrode composition comprising: a sulfide-based inorganic solid electrolyte; a negative electrode active material containing a silicon atom or a tin atom; and a polymer, in which the polymer has substantially no adsorption capacity to the negative electrode active material and the sulfide-based inorganic solid electrolyte, and a modulus of elasticity of the polymer measured in accordance with JIS K 7161 (2014) is 100 MPa or higher and 1000 MPa or lower, and in a case where a negative electrode active material layer is formed of the negative electrode composition, the polymer is contained in the negative electrode active material layer in a particle form.

<2> The negative electrode composition according to <1>, in which a content of the polymer in a total solid component is 5% to 20% by mass.

<3> The negative electrode composition according to <1> or <2>, in which in the polymer, a carbon atom content of an ester bond, an amide bond, a carboxyl group, a carbonyl group, a urethane bond, and an imide bond in a total carbon atom content of the polymer is 10% by mol or less.

<4> The negative electrode composition according to any one of <1> to <3>, further comprising an electron conductive carbon material.

<5> The negative electrode composition according to <4>, in which the electron conductive carbon material has an aspect ratio of 3 or more.

<6> The negative electrode composition according to any one of <1> to <5>, in which the negative electrode active material contains a silicon atom.

<7> The negative electrode composition according to <6>, in which a content of silicon atom in all atoms constituting the negative electrode active material is 50% by mol or more.

<8> A negative electrode sheet for an all-solid state secondary battery comprising a negative electrode active material layer formed of the negative electrode composition according to any one of <1> to <7>.

<9> An all-solid state secondary battery comprising, in the following order: a positive electrode active material layer; a solid electrolyte layer; and a negative electrode active material layer, in which the negative electrode active material layer is a layer formed of the negative electrode composition according to any one of <1> to <7>.

<10> A method for manufacturing a negative electrode sheet for an all-solid state secondary battery comprising performing a coating with the negative electrode composition according to any one of <1> to <7>.

<11> A method for manufacturing an all-solid state secondary battery comprising: obtaining a negative electrode sheet for an all-solid state secondary battery by the manufacturing method according to <10>; and manufacturing an all-solid state secondary battery using the negative electrode sheet for an all-solid state secondary battery.

By using the negative electrode composition as a material for forming a negative electrode active material layer according to the aspect of the present invention, which includes a negative electrode active material containing a silicon atom or a tin atom, the all-solid state secondary battery which has low resistance and a discharge capacity that is less likely to be lowered even though charging and discharging are repeated can be realized. In addition, by using the negative electrode sheet for an all-solid state secondary battery and the negative electrode active material layer of the all-solid state secondary battery according to the aspect of the present invention, the all-solid state secondary battery which has low resistance and a discharge capacity that is less likely to be lowered even though charging and discharging are repeated can be realized. Furthermore, the all-solid state secondary battery according to the aspect of the present invention has low resistance and a discharge capacity that is less likely to be lowered even though charging and discharging are repeated. According to the method for manufacturing the negative electrode sheet for an all-solid state secondary battery and the method for manufacturing the all-solid state secondary battery according to the aspect of the present invention, the above described negative electrode sheet for an all-solid state secondary battery and all-solid state secondary battery can be obtained.

DESCRIPTION OF THE PREFERRED EMBODIMENTS

Figure 1:
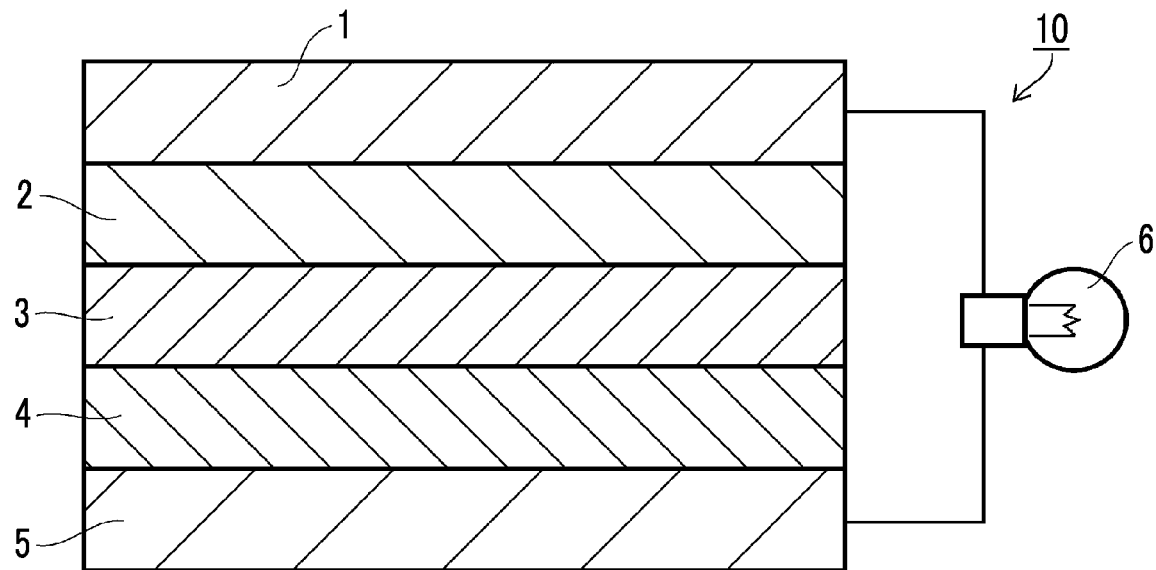
FIG. 1 is a longitudinal cross-sectional view schematically illustrating an all-solid state secondary battery according to a preferred embodiment of the present invention.

In the description of the present invention, numerical ranges expressed using "to" include numerical values before and after the "to" as the lower limit value and the upper limit value.

In the present invention, unless otherwise specified, the term "molecular weight of a polymer" refers to a mass average molecular weight in terms of standard polystyrene conversion measured by gel permeation chromatography (GPC). A value which is measured using the method of condition 1 or condition 2 (priority) below as the measurement method is set as a base. Here, depending on the polymer type or the like, a suitable eluent may be appropriately selected.

(Condition 1)
Column: Two pieces of TOSOH TSKgel Super AWM-H (trade name, manufactured by Tosoh Corporation) are connected to each other
Carrier: 10 mM LiBr/N-methylpyrrolidone
Measurement temperature: 40° C.
Carrier flow rate: 1.0 mL/min
Specimen concentration: 0.1% by mass
Detector: RI (refractive index) detector (Condition 2)
Column: Column obtained by connecting TOSOH TSKgel Super HZM-H, TOSOH TSKgel Super HZ4000 with TOSOH TSKgel Super HZ2000 (both trade name, manufactured by Tosoh Corporation) is used.
Carrier: Tetrahydrofuran
Measurement temperature: 40° C.
Carrier flow rate: 1.0 mL/min
Specimen concentration: 0.1% by mass
Detector: RI (refractive index) detector

[Negative Electrode Composition]

A negative electrode composition according to an embodiment of the present invention contains a sulfide-based inorganic solid electrolyte, a negative electrode active material containing a silicon atom or a tin atom (hereinafter, simply referred to as a negative electrode active material), and a polymer. The polymer has substantially no adsorption capacity to both the negative electrode active material and the sulfide-based inorganic solid electrolyte. The polymer has a modulus of elasticity of 100 MPa or higher and 1000 MPa or lower as measured in accordance with JIS K 7161 (2014).

The polymer used in the present invention exists in a particle form in a negative electrode active material layer. As a result, the present invention achieves the desired effect. It is preferable that the polymer also exists as particles in the negative electrode composition. That is, the negative electrode composition according to the embodiment of the present invention is preferably a dispersion liquid (slurry) formed by dispersing the sulfide-based inorganic solid electrolyte, the negative electrode active material, and the polymer. However, the polymer may be in a dissolved state in the negative electrode composition as long as the polymer can exist in the particle form in the negative electrode active material layer formed by using the negative electrode composition. For example, in a case where the negative electrode composition contains a dispersant (solvent), the polymer may be dissolved in the dispersant. Examples of a method for allowing the polymer in a dissolved state in the solvent in the negative electrode composition to exist in the particle form in the negative electrode active material layer formed by this composition include a method for precipitating a polymer before the polymer is brought into film form. By using a polymer having low solubility with respect to a solvent, the timing of precipitation is accelerated, and the precipitation starts in a state where the polymer is widely wet and spread. Therefore, the polymer can exist in the negative electrode active material layer in the particle form, not in the film form. In addition, by adjusting a drying condition of the solvent and shortening a drying time, the solvent can be volatilized in a state where the polymer is sufficiently diffused to precipitate the polymer, so that the polymer can exist in the particle form in the negative electrode active material layer.

The negative electrode sheet for an all-solid state secondary battery and the all-solid state secondary battery according to the embodiment of the present invention may contain a non-particulate polymer in the negative electrode active material layer as long as the effects of the present invention are not impaired.

The shape of the polymer in the negative electrode active material layer can be observed by, for example, a scanning electron microscope.

In the description of the present invention, the "polymer has substantially no adsorption capacity to the negative electrode active material and the sulfide-based inorganic solid electrolyte" means that the polymer has a low adsorption capacity while having the adsorption capacity with respect to the negative electrode active material and the sulfide-based inorganic solid electrolyte. Specifically, the "polymer has substantially no adsorption capacity to the negative electrode active material and the sulfide-based inorganic solid electrolyte" means that the polymer has an adsorption rate of 10% or less with respect to the negative electrode active material, and the polymer has an adsorption rate of 10% or less with respect to the sulfide-based inorganic solid electrolyte. The polymer preferably has an adsorption rate of 5% or less with respect to the negative electrode active material, and the polymer preferably has an adsorption rate of 5% or less with respect to the sulfide-based inorganic solid electrolyte. From the viewpoint of binding the solid particles with each other or binding the negative electrode active material layer with the solid electrolyte layer without coating the solid particles, the polymer preferably has an adsorption rate of 0.1% or more with respect to the negative electrode active material, and the polymer preferably has an adsorption rate of 0.1% or more with respect to the sulfide-based inorganic solid electrolyte.

The adsorption rate can be determined by a method described in Examples.

The adsorption capacity of the polymer with respect to the negative electrode active material and the sulfide-based inorganic solid electrolyte, and the modulus of elasticity of the polymer can be adjusted by, for example, a mixing amount of monomer raw materials and the like during a synthesis. For example, the adsorption capacity can be suppressed by increasing the proportion of a monomer component containing no functional group having a large polarity.

In the negative electrode composition according to the embodiment of the present invention, the negative electrode active material contains silicon atoms or tin atoms. Therefore, the all-solid state secondary battery in which the negative electrode active material layer is formed of this composition has a large volume change in the negative electrode active material layer during charging and discharging as compared with a case of using graphite, acetylene black, or the like as an active material for the negative electrode active material layer. Nevertheless, this all-solid state secondary battery can realize low resistance and excellent cycle characteristics. The reason for this is not yet clear, but it is presumed as follows.

In the polymer constituting a binder (binding agent) in the related art, it was focused on enhancing a binding force between solid particles in the negative electrode active material or the like and a binding force between layers constituting the all-solid state secondary battery, and there was a tendency to use polymers having a high adsorption capacity with respect to solid particles in order to improve battery performance. On the other hand, the polymer used in the present invention exists as particles in the negative electrode active material layer, and has a lower adsorption capacity with respect to solid particles than the polymer constituting the binder in the related art. Therefore, even though a negative electrode active material having a large volume change due to charging and discharging is used, it is considered that it is possible to suppress an increase in a coating area of a surface in a solid particle of the polymer due to wetting and spreading, and to suppress an increase in interfacial resistance of the solid particles, while maintaining a certain adsorption degree with respect to the solid particles. Furthermore, it is considered that an increase in resistance in the negative electrode active material layer before and after the battery operation can be suppressed since the polymer shape changes flexibly to some extent according to expansion and contraction of the negative electrode active material, a volume of voids to be formed can be reduced, and an increase and decrease in the volume of the negative electrode active material layer as a whole can be reduced.

The negative electrode composition according to the embodiment of the present invention is a non-aqueous composition. In the present invention, the non-aqueous composition includes, in addition to an aspect containing no water, a form having a water content ratio (referred to as a water content amount) of 50 ppm or less. In the non-aqueous composition, a water content ratio is preferably 20 ppm or less, more preferably 10 ppm or less, and even more preferably 5 ppm or less. A water content amount indicates an amount of water (a mass ratio with respect to the negative electrode composition) contained in the negative electrode composition. The water content amount can be determined by filtering the negative electrode composition through a 0.45 µm membrane filter and Karl Fischer titration.

Hereinafter, components contained in the negative electrode composition according to the embodiment of the present invention and components that may be contained will be described.

<Sulfide-Based Inorganic Solid Electrolytes>

In the present invention, the inorganic solid electrolyte is a solid electrolyte having inorganic properties, and the solid electrolyte refers to a solid-form electrolyte capable of migrating ions therein. The inorganic solid electrolyte is clearly differentiated from organic solid electrolytes (high-molecular-weight electrolytes represented by polyethylene oxide (PEO) or the like and organic electrolyte salts represented by lithium bis(trifluoromethanesulfonyl)imide (LiTFSI) or the like) since the inorganic solid electrolyte does not include any organic substances as a principal ion conductive material. In addition, the inorganic solid electrolyte is a solid in a static state, and thus, generally is not disassociated or liberated into cations and anions. Due to this fact, the inorganic solid electrolyte is also clearly differentiated from inorganic electrolyte salts of which cations and anions are disassociated or liberated in electrolytic solutions or polymers ($LiPF_6$, $LiBF_4$, LiFSI, LiCl, and the like). The inorganic solid electrolyte is not particularly limited as long as the inorganic solid electrolyte has ion conductivity of metals belonging to Group I or II of the periodic table and is generally a substance not having electron conductivity.

In the present invention, the inorganic solid electrolyte includes ion conductivity of metals belonging to Group I or II of the periodic table. As the inorganic solid electrolyte, it is possible to appropriately select and use solid electrolyte materials that are applied to these kinds of products. Representative examples of the inorganic solid electrolyte include (i) a sulfide-based inorganic solid electrolyte, and (ii) an oxide-based inorganic solid electrolyte. The negative electrode composition according to the embodiment of the present invention contains the sulfide-based inorganic solid electrolyte, and may contain other inorganic solid electrolytes (typically, oxide-based inorganic solid electrolytes) as long as the effects of the present invention are not impaired.

In a case where the all-solid state secondary battery according to the embodiment of the present invention is an all-solid state lithium ion secondary battery, the inorganic solid electrolyte preferably has ion conductivity of lithium ions.

(i) Sulfide-Based Inorganic Solid Electrolytes

Sulfide-based inorganic solid electrolytes are preferably compounds which contain sulfur atoms, have ion conductivity of metals belonging to Group I or II of the periodic table, and have electron-insulating properties. The sulfide-based inorganic solid electrolytes are preferably inorganic solid electrolytes which, as elements, contain at least Li, S, and P and have lithium ion conductivity, but the sulfide-based inorganic solid electrolytes may also include elements other than Li, S, and P depending on the purposes or cases.

Examples of the sulfide-based inorganic solid electrolytes include lithium ion conductive sulfide-based inorganic solid electrolytes satisfying a composition represented by Formula (I).

$$L_{a1}M_{b1}P_{c1}S_{d1}A_{e1} \quad \text{Formula (I)}$$

In the formula, L represents an element selected from Li, Na, and K and is preferably Li. M represents an element selected from B, Zn, Sn, Si, Cu, Ga, Sb, Al, and Ge. A represents an element selected from I, Br, Cl, and F. a1 to e1 represent the compositional ratios among the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the respective elements can be controlled by adjusting the ratios of raw material compounds mixed to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two or more raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_2S_5$. In a case in which the ratio between $Li_2S$ and $P_2S_5$ is set in the above described range, it is possible to increase the lithium ion conductivity. Specifically, the lithium ion conductivity can be preferably set to $1\times10^{-4}$ S/cm or higher and more preferably set to $1\times10^{-3}$ S/cm or higher. The upper limit is not particularly limited, but realistically $1\times10^{-1}$ S/cm or lower.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Mixing ratios of the respective raw materials do not matter. Examples of a method of synthesizing sulfide-based inorganic solid electrolyte materials using the above described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolytes

Oxide-based inorganic solid electrolytes are preferably compounds which contain oxygen atoms, have ion conductivity of metals belonging to Group I or II of the periodic table, and have electron-insulating properties.

The ion conductivity of the oxide-based inorganic solid electrolyte is preferably $1\times10^{-6}$ S/cm or higher, more preferably $5\times10^{-6}$ S/cm or higher, and particularly preferably $1\times10^{-5}$ S/cm or higher. The upper limit is not particularly limited, but realistically $1\times10^{-1}$ S/cm or lower.

Specific examples of the compounds include $Li_{xa}La_{ya}TiO_3$ [xa=0.3 to 0.7 and ya=0.3 to 0.7] (LLT), $Li_{xb}La_{yb}Zr_{zb}M^{bb}{}_{mb}O_{nb}$ ($M^{bb}$ is at least one element of Al, Mg, Ca, Sr, V, Nb, Ta, Ti, Ge, In or Sn, xb satisfies 5≤xb≤10, yb satisfies 1≤yb≤4, zb satisfies 1≤zb≤4, mb satisfies 0≤mb≤2, and nb satisfies 5≤nb≤20.), $Li_{xc}B_{yc}M^{cc}{}_{zc}O_{nc}$ ($M^{cc}$ is at least one element of C, S, Al, Si, Ga, Ge, In, or Sn, xc satisfies 0<xc≤5, yc satisfies 0<yc≤1, zc satisfies 0<zc≤1, and nc satisfies 0<nc≤6), $Li_{xd}(Al, Ga)_{yd}(Ti, Ge)_{zd}Si_{ad}P_{md}O_{nd}$ (1≤xd≤3, 0≤yd≤1, 0≤zd≤2, 0≤ad≤1, 1≤md≤7, 3≤nd≤13), $Li_{(3-2xe)}M^{ee}{}_{xe}D^{ee}O$ (xe represents the number of 0 or more and 0.1 or less, and $M^{ee}$ represents a divalent metal atom. $D^{ee}$ represents a halogen atom or a combination of two or more halogen atoms), $Li_{xf}Si_{yf}O_{zf}$ (1≤xf≤5, 0<yf≤3, 1≤zf≤10), $Li_{xg}S_{yg}O_{zg}$ (1≤xg≤3, 0<yg≤2, 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super ionic conductor (LISICON)-type crystal structure, $La_{0.55}Li_{0.35}TiO_3$ having a perovskite-type crystal structure, $LiTi_2P_3O_{12}$ having a natrium super ionic conductor (NASICON)-type crystal structure, $Li_{1+xh+yh}(Al, Ga)_{xh}(Ti, Ge)_{2-xh}Si_{yh}P_{3-yh}O_{12}$ (0≤xh≤1, 0≤yh≤1), $Li_7La_3Zr_2O_{12}$ (LLZ) having a garnet-type crystal structure. In addition, phosphorus compounds containing Li, P, and O are also desirable. Examples thereof include lithium phosphate ($Li_3PO_4$), LiPON in which some of oxygen atom in lithium phosphate are substituted with nitrogen atom, $LiPOD^1$ ($D^1$ is at least one element selected from Ti, V, Cr, Mn, Fe, Co, Ni, Cu, Zr, Nb, Mo, Ru, Ag, Ta, W, Pt, Au, or the like), and the like. It is also possible to preferably use $LiA^1ON$ ($A^1$ represents at least one element selected from Si, B, Ge, Al, C, Ga, or the like) and the like.

The sulfide-based inorganic solid electrolyte is preferably particles in the negative electrode active material layer. In this case, an average particle size (volume average particle size) of the inorganic solid electrolyte is not particularly limited, but is preferably 0.01 μm or higher, more preferably 0.1 μm or higher. The upper limit is preferably 100 μm or lower and more preferably 50 μm or lower. The "volume average particle size" is a volume-based median diameter. The median diameter corresponds to a cumulative 50% in a case where a particle size distribution is expressed as a cumulative distribution.

An average particle size of the inorganic solid electrolyte particles is measured in the following order. The inorganic solid electrolyte particles are diluted and prepared to 1% by mass of a dispersion liquid by using water (heptane in a case in which a substance is unstable in water) in a 20 mL sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (trade name, manufactured by Horiba Ltd.), and a quartz cell for measurement at a temperature of 25° C., thereby obtaining a volume average particle size. Regarding other detailed conditions and the like, the description of JIS Z 8828:2013 "particle size analysis-Dynamic light scattering method" is referred to as necessary. Five specimens are produced and measured per level, and the average values thereof are employed.

The sulfide-based inorganic solid electrolyte may be used singly or two or more sulfide-based inorganic solid electrolytes may be used in combination.

The content of the sulfide-based inorganic solid electrolyte in the negative electrode composition is not particularly limited, but from the viewpoint of dispersibility, reducing interfacial resistance and a binding property, a total content of the sulfide-based inorganic solid electrolyte and the negative electrode active material described later is preferably 50% by mass or more, more preferably 70% by mass or more, and even more preferably 90% by mass or more, with respect to 100% by mass of a solid content. The upper limit is preferably 99.9% by mass or less, more preferably 99.5% by mass or less, and particularly preferably 99% by mass or less from the same viewpoint.

In the present invention, the term "solid content (a solid component)" refers to a component which does not disappear by volatilization or evaporation in a case where the negative electrode composition is dried at 150° C. for 6 hours under a pressure of 1 mmHg and a nitrogen atmosphere. Typically, the solid content refers to components other than a dispersant described later.

<Negative Electrode Active Material with Silicon Atom or Tin Atom>

The negative electrode composition according to the embodiment of the present invention contains a negative electrode active material containing silicon atoms or tin atoms. This negative electrode active material is a material capable of inserting and releasing ions of a metal element belonging to Group I or II of the periodic table.

The negative electrode active material used in the present invention is preferably reversibly inserting and releasing lithium ions. As described above, in the negative electrode active material layer formed of the negative electrode composition according to the embodiment of the present invention, a shape of the polymer follows a volume change due to expansion and contraction of the negative electrode active material. Therefore, in the present invention, as the negative electrode active material, a negative electrode active material that is greatly expanded and contracted due to charging and discharging and that has silicon atoms or tin atoms capable of being alloyed with lithium can be used. As the negative electrode active material containing silicon atoms, it is preferable that a negative electrode active material has a silicon atom content of 50% by mol or more (preferably 70% by mol or more, and more preferably 80% by mol or more) with respect to all constituent atoms. Thereby, it possible to increase the capacity of the all-solid state secondary battery and extend the life of the battery.

Specific examples of the negative electrode active material used in the present invention preferably include Sn, Si, SiO (0<x≤1), titanium, vanadium, chromium, manganese, nickel, copper, lanthanum, and alloys ($LaSi_2$, $VSi_2$) containing any atoms among these atoms, mixtures of these atoms or compounds, organized active materials (for example, $LaSi_2/Si$, and the like), SnO, $SnO_2$, $SnSiO_3$, SnS, $SnS_2$, or $SnSiS_3$.

Since SiO itself can be used as a negative electrode active material (metalloid oxide) and generates Si by operation of an all-solid state secondary battery, SiO can be used as an active material that can form an alloy with lithium (a precursor material).

A shape of the negative electrode active material is not particularly limited, but is preferably particulate. The average particle size of the negative electrode active material is preferably 0.1 to 60 μm. The average particle size of the negative electrode active material particles can be measured in the same manner as the average particle size of the inorganic solid electrolyte. In order to provide a negative electrode active material having a predetermined particle size, an ordinary crusher or classifier may be used. For example, a mortar, a ball mill, a sand mill, an oscillatory ball mill, a satellite ball mill, a planetary ball mill, a swirling airflow-type jet mill, a sieve, or the like is suitably used. During crushing, as necessary, it is also possible to carry out wet-type crushing in which water or an organic solvent such as methanol is made to coexist. In order to provide a desired particle size, classification is preferably carried out. A classification method is not particularly limited, and it is possible to use a sieve, a wind power classifier, or the like, as necessary. Both dry-type classification and wet-type classification can be carried out.

The negative electrode active material may be used singly or two or more negative electrode active materials may be used in combination.

In a case where the negative electrode active material layer is formed, the mass (mg) (basis weight) of the negative electrode active material per unit area ($cm^2$) of the negative electrode active material layer is not particularly limited. The mass can be determined appropriately according to the designed battery capacity.

The content of the negative electrode active material in the negative electrode composition is not particularly limited, is preferably 10% to 80% by mass, and more preferably 20% to 80% by mass, with respect to 100% by mass of a solid content.

(Coating of Negative Electrode Active Material)

The surface of the negative electrode active material may be coated with another metal oxide. Examples of the surface coating agent include metal oxides containing Ti, Nb, Ta, W, Zr, Al, Si, or Li, and the like. Specific examples thereof include titanium oxide spinel, tantalum-based oxides, niobium-based oxides, lithium niobate-based compounds, and the like, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, $B_2O_3$, and the like.

In addition, a surface treatment may be carried out on the surfaces of electrodes including the negative electrode active material using sulfur, or phosphorous.

Furthermore, a surface treatment may be carried out on the surfaces of particles of the negative electrode active material with an active light ray or an active gas (plasma or the like) before or after the coating of the surfaces.

<Polymer>

A polymer used in the present invention is not particularly limited, as long as the polymer satisfies conditions of existing in a particle form in the negative electrode sheet for an all-solid state secondary battery and in the negative electrode active material layer of the all-solid state secondary battery, which are formed by using the negative electrode composition according to the embodiment of the present invention, having substantially no adsorption capacity to the negative electrode active material containing silicon atoms or tin atoms, and having the modulus of elasticity measured in accordance with JIS K 7161 (2014) of 100 MPa or higher and 1000 MPa or lower (preferably 150 MPa or higher and 900 MPa or lower, and more preferably 180 MPa or higher and 850 MPa or lower).

The shape of the polymer existing in the particle form in the negative electrode active material layer is not particularly limited, may be flat, amorphous, or the like, but spherical or granular is preferable. An aspect ratio of the particulate polymer is, for example, preferably 1 to 100, more preferably 1 to 50, and even more preferably 1 to 30. The aspect ratio of the particulate polymer can be calculated in the same manner as a method for calculating an aspect ratio of particles constituting a conductive auxiliary agent described in Examples described later.

The particle size of the particulate polymer is not particularly limited, and is preferably 10 to 1000 nm, more preferably 20 to 500 nm, more preferably 30 to 300 nm, and even more preferably 50 to 200 nm. In the present specification, the particle size of the particulate polymer is a volume-based median diameter, and can be measured in the same manner as the inorganic solid electrolyte.

The particle size of the particulate polymer in a layer constituting the all-solid state secondary battery is measured by, for example, disassembling the battery and peeling off the constituent layer containing the particulate polymer, performing measurement on the constituent layer, and subtracting the measured value of the particle size of the particles other than the particulate polymer, which is measured in advance.

The particle size of the particulate polymer can be adjusted by, for example, a content of constituent components in the polymer, and the like.

Specific examples of the polymer include fluorine-containing polymers, polyurethanes, polyimides, and polyamides, fluorine-containing polymers, polyurethanes, and polyimides are preferable, and fluorine-containing polymers and polyimides are more preferable.

In order to suppress the adsorption capacity of the polymer to the active material and the sulfide-based inorganic solid electrolyte, a carbon atom content of an ester bond, an amide bond, a carboxyl group, a carbonyl group, a urethane bond, and an imide bond is preferably 10% by mol or less, and more preferably 8% by mol or less, in a total carbon atom content (molar amount) of the polymer. The lower limit is not particularly limited, but may be 0% by mol.

In a case where the polymer has an ester bond, an amide bond, a carbonyl group, a urethane bond, or an imide bond, the ester bond, the amide bond, the carbonyl group, the urethane bond, or the imide bond may be contained in either the main chain or the side chain of the polymer.

The carbonyl group does not contain an ester bond, an amide bond, a urethane bond, or an imide bond, and the amide bond does not contain a urethane bond, or an imide bond.

A content of the bonds and groups can be adjusted by a mixing amount of raw materials and the like during a synthesis.

The content of the bonds and groups can be calculated by, for example, $^{13}C$-NMR.

The polymer used in the present invention is preferably a polymer that is less likely to undergo a reduction reaction in a range of 2.5 V to 0.05 V (vs Li/Li+ standard). Whether or not the reduction reaction is less likely to undergo a reduction reaction is confirmed by the following method.

A mixture of 1 g of a polymer and 0.1 g of a conductive auxiliary agent (acetylene black) is applied onto a platinum plate to produce a polymer film. A platinum plate on which a polymer film disposed on a working electrode in a beaker of a potentiostat is connected, Li metal is disposed on the counter electrode, Li metal is disposed on the reference electrode in the beaker, the beaker is filled with an electrolytic solution (1.0 M solution of $LiPF_6$, a solvent is a mixed solution of ethylene carbonate (EC) and ethyl methyl carbonate (EMC), EC/EMC=1/1 (volume ratio)), an evaluation of three reciprocating potentials from 2.5 V to 0.05 V at 10 mV/sec is performed. In a case where a total current of current values flowing in a case of sweeping from 2.5 V to 0.05 V at this time is smaller than a total current in a case where the same operation is performed using a platinum plate to which no polymer film is attached, it is evaluated that the reduction reaction is less likely to occur.

The mass average molecular weight of the polymer used in the present invention is not particularly limited, but is, for example, 5000 to 5,000,000.

The polymer used in the present invention can be synthesized by an ordinary method, or a commercially available product may be used. Specific examples of commercially available products are described below together with the product name or model number, but the present invention is not limited thereto.

Examples of the fluorine-containing polymer include Trepearl (polyvinylidene fluoride (PVDF) (registered trademark), manufactured by TORAY INDUSTRIES, INC.), modified PVDF (manufactured by Arkema S.A. (model number 2500-20)), and PVDF-HFP (copolymer of vinylidene fluoride and hexafluoropropylene (manufactured by Arkema S.A.), model number 4500-20), and Trepearl (polyvinylidene fluoride (PVDF) (registered trademark), manufactured by TORAY INDUSTRIES, INC.) and modified PVDF (manufactured by Arkema S.A. (model number 2500-20)) are preferable.

The modulus of elasticity of the fluorine-containing polymer measured in accordance with JIS K 7161 (2014) is 100 to 350 MPa, and a reaction potential (reduction reaction potential) is lower than 0.05 V or higher than 2.5 V. That is, the fluorine-containing polymer is less likely to undergo a reduction reaction at 2.5 V to 0.05 V.

Examples of the polyurethane include DAIMICBEAZS UCN-8070CM (average particle size: 7 μm, manufactured by Dainichiseika Color & Chemicals Mfg.Co., Ltd.), DAIMICBEAZS UCN-8150CM (average particle size: 15 μm, manufactured by Dainichiseika Color & Chemicals Mfg.Co., Ltd.), ART-PEARL C (manufactured by Negami Chemical Industrial Co., Ltd.), ART-PEARL P (manufactured by Negami Chemical Industrial Co., Ltd.), ART-PEARL JB (manufactured by Negami Chemical Industrial Co., Ltd.), ART-PEARL U (manufactured by Negami Chemical Industrial Co., Ltd.), ART-PEARL CE (manufactured by Negami Chemical Industrial Co., Ltd.), ART-PEARL AK (manufactured by Negami Chemical Industrial Co., Ltd.), ART-PEARL HI (manufactured by Negami Chemical Industrial Co., Ltd.), ART-PEARL MM (manufactured by Negami Chemical Industrial Co., Ltd.), ART-PEARL FF (manufactured by Negami Chemical Industrial Co., Ltd.), ART-PEARL TK (manufactured by Negami Chemical Industrial Co., Ltd.), ART-PEARL C-TH (manufactured by Negami Chemical Industrial Co., Ltd.), ART-PEARL RW (manufactured by Negami Chemical Industrial Co., Ltd.), ART-PEARL RX (manufactured by Negami Chemical Industrial Co., Ltd.), ART-PEARL RY (manufactured by Negami Chemical Industrial Co., Ltd.), ART-PEARL RZ (manufactured by Negami Chemical Industrial Co., Ltd.), ART-PEARL RU (manufactured by Negami Chemical Industrial Co., Ltd.), ART-PEARL RV (manufactured by Negami Chemical Industrial Co., Ltd.), ART-PEARL BP (manufactured by Negami Chemical Industrial Co., Ltd.), GLOSSDELL S series (manufactured by Mitsui Chemicals, Inc.), GLOSSDELL M series (manufactured by Mitsui Chemicals, Inc.), GLOSSDELL V series (manufactured by Mitsui Chemicals, Inc.), GLOSSDELL T series (manufactured by Mitsui Chemicals, Inc.), and INFINERGY (manufactured by BASF) (all the examples are trade names).

The modulus of elasticity of the polyurethane measured in accordance with JIS K 7161 (2014) is 100 to 500 MPa, and a reaction potential is lower than 0.05 V or higher than 2.5 V. That is, the polyurethane is less likely to undergo a reduction reaction at 2.5 V to 0.05 V.

Examples of the polyimide include Polyimide powder P84 (R) NT (manufactured by Daicel-Evonik Ltd.), Polyimide powder PIP-3 (manufactured by Seishin Enterprise Co., Ltd.), Polyimide powder PIP-25 (manufactured by Seishin Enterprise Co., Ltd.), Polyimide powder PIP-60 (manufactured by Seishin Enterprise Co., Ltd.), Polyimide powder UIP-R (manufactured by Ube Industries, Ltd.), and Polyimide powder UIP-S (manufactured by Ube Industries, Ltd.) (all the examples are trade names).

The modulus of elasticity of the polyimide measured in accordance with JIS K 7161 (2014) is 100 to 500 MPa, and a reaction potential is lower than 0.05 V or higher than 2.5 V. That is, the polyimide is less likely to undergo a reduction reaction at 2.5 V to 0.05 V.

The polymer may be used singly or two or more polymers may be used in combination. The content of the polymer in a total solid component in the negative electrode composition according to the embodiment of the present invention is not particularly limited, but is preferably 5% to 20% by mass, and more preferably 5% to 15% by mass. Since the polymer used in the present invention has substantially no adsorption capacity to the negative electrode active material containing silicon atoms or tin atoms and the sulfide-based inorganic solid electrolyte, by adopting the above content, both suppression of interfacial resistance of the solid particles and an increase in resistance of the all-solid state secondary battery and an improvement on cycle characteristics can be achieved.

<Electron Conductive Carbon Material>

The negative electrode composition according to the embodiment of the present invention preferably contains an electron conductive carbon material. The carbon material means a material (substance) in which a carbon atom content is 95% by mass or more in all constituent atoms. The "electron conductive carbon material" means a material having an electron conductivity of 1 mS/cm.

The electron conductivity is calculated as follows.

200 mg of powdered carbon material is put into an outer cylinder of a molding machine (for example, an outer cylinder of the mold φ10 for a heat press machine manufactured by AS ONE Corporation is a ceramic outer cylinder) formed of two metal rods of φ10 mm (length of 6 cm) and a donut-shaped ceramic outer cylinder (inner diameter of 10 mm, length of 5.5 cm), and the metal rods are inserted from upper and lower openings and pressurized to produce a molded product inside the outer cylinder. While pressurizing the molded product at 50 MPa, terminals are connected to the upper and lower metal rods, and a voltage of 50 mV is applied. The electron conductivity can be calculated by reading a current value at this time.

Specific examples of the electron conductive carbon material include graphite, carbon black, irregular carbon, carbon fibers, carbonaceous materials, and the like among the following conductive auxiliary agents.

<Conductive Auxiliary Agent>

The negative electrode composition according to the embodiment of the present invention can also contain a conductive auxiliary agent.

The conductive auxiliary agent is not particularly limited, and conductive auxiliary agents that are known as ordinary conductive auxiliary agents can be used. The conductive auxiliary agent may be, for example, as an electron conductive material, graphite such as natural graphite or artificial graphite, carbon black such as acetylene black, Ketjen black, or furnace black, irregular carbon such as needle cokes, a carbon fiber such as a Vapor grown carbon fiber or a carbon nanotube, or a carbonaceous material such as graphene or fullerene, also may be metal powder or a metal fiber of copper, nickel, or the like, and a conductive polymer such as polyaniline, polypyrrole, polythiophene, polyacetylene, or a polyphenylene derivative may be used.

In the present invention, in a case where the negative electrode active material and the conductive auxiliary agent are used in combination, conductive auxiliary agents, among the above conductive auxiliary agents, which do not insert and release Li during charging and discharging of the battery and do not function as a negative electrode are used. Therefore, among the conductive auxiliary agents, conductive auxiliary agents that can function as an active material in the negative electrode active material layer during charging and discharging of the battery are classified as negative electrode active materials, not conductive auxiliary agents. Whether or not conductive auxiliary agents function as a negative electrode active material during charging and discharging of the battery is not univocal and is determined based on a combination with the negative electrode active material.

The conductive auxiliary agent may be used singly or two or more kinds of conductive auxiliary agents may be used.

A total content of the conductive auxiliary agent in the negative electrode composition is preferably 0.1% to 5% by mass, and more preferably 0.5% to 3% by mass, with respect to 100% by mass of a solid content.

A shape of the conductive auxiliary agent is not particularly limited, but is preferably particulate. The median diameter D50 of the conductive auxiliary agent is not particularly limited, and for example, preferably 0.01 to 1 μm, and more preferably 0.02 to 0.1 μm.

The aspect ratio of the particles constituting the conductive auxiliary agent is not particularly limited, but is preferably 3 or higher, more preferably 5 or higher, even more preferably 10 or higher, and still even more preferably 50 or higher. The upper limit is preferably 500 or lower, more preferably 350 or lower, even more preferably 200 or lower, and still even more preferably 100 or lower. The aspect ratio of the particles constituting the conductive auxiliary agent is in the above range, so that the resistance of the all-solid state secondary battery can be further reduced.

The conductive auxiliary agent may be used singly or two or more kinds of conductive auxiliary agents may be used.

A total content of the conductive auxiliary agent in the negative electrode composition is preferably 0.1% to 5% by mass, and more preferably 0.5% to 3% by mass, with respect to 100% by mass of a solid content.

A shape of the conductive auxiliary agent is not particularly limited, but is preferably particulate. The median diameter D50 of the conductive auxiliary agent is not particularly limited, and for example, preferably 0.01 to 1 μm, and more preferably 0.02 to 0.1 μm.

<Dispersant>

The negative electrode composition according to the embodiment of the present invention can contain a dispersant. In a case where this negative electrode composition contains a dispersant, composition uniformity, handleability, and the like can be improved.

The dispersant may be any dispersant that disperses each component contained in the negative electrode composition according to the embodiment of the present invention.

Examples of the dispersant used in the present invention include various organic solvents, and examples of the organic solvent include various solvents such as alcohol compounds, ether compounds, amide compounds, amine compounds, ketone compounds, aromatic compounds, aliphatic compounds, nitrile compounds, and ester compounds.

Examples of the alcohol compound include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, 1,4-butanediol, and the like.

Examples of the ether compound include alkylene glycol alkyl ethers (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, dipropylene glycol monomethyl ether, tripropylene glycol monomethyl ether, diethylene glycol monobutyl ether, and the like), dialkyl ethers (dimethyl ether, diethyl ether, diisopropyl ether, dibutyl ether, and the like), cyclic ethers (tetrahydrofuran, and dioxane (including 1,2-isomer, 1,3-isomer, and 1,4-isomer), and the like).

Examples of the amide compound include N,N-dimethylformamide, N-methyl-2-pyrrolidone, 2-pyrrolidinone, 1,3-dimethyl-2-imidazolidinone, 2-pyrrolidinone, ε-caprolactam, formamide, N-methylformamide, acetamide,N-methylacetamide, N,N-dimethylacetamide, N-methylpropanamide, hexamethylphosphoric triamide, and the like.

Examples of the amine compound include triethylamine, diisopropylethylamine, tributylamine, and the like.

Examples of the ketone compound include acetone, methyl ethyl ketone (MEK), methyl isobutyl ketone, cyclohexanone, diisobutyl ketone (DIBK), and the like.

Examples of the aromatic compound include aromatic hydrocarbon compounds such as benzene, toluene, xylene, and the like.

Examples of the aliphatic compound include aliphatic hydrocarbon compounds such as hexane, heptane, octane, and decane, and the like.

Examples of the nitrile compound include acetonitrile, propionitrile, isobutyronitrile, and the like.

Examples of the ester compound include carboxylates such as ethyl acetate, butyl acetate, propyl acetate, propyl butyrate, isopropyl butyrate, butyl butyrate, isobutyl butyrate, butyl pentanoate, ethyl isobutyrate, propyl isobutyrate, isopropyl isobutyrate, isobutyl isobutyrate, propyl pivalate, isopropyl pivalate, butyl pivalate, isobutyl pivalate, and the like.

Examples of the non-aqueous dispersant include the above aromatic compounds, aliphatic compounds, and the like.

In the present invention, the dispersant is preferably a ketone compound, an ester compound, an aromatic compound, or an aliphatic compound, and more preferably contains at least one selected from a ketone compound, an ester compound, an aromatic compound, or an aliphatic compound.

The dispersant contained in the negative electrode composition may be one kind or two or more kinds of dispersants, and is preferably two or more kinds thereof A total content of the dispersant in the negative electrode composition is not particularly limited, but is preferably 20% to 80% by mass, more preferably 30% to 70% by mass, and particularly preferably 40% to 60% by mass.

<Other Additives>

The negative electrode composition according to the embodiment of the present invention can contain, as desired, a lithium salt, an ionic liquid, a thickener, a defoamer, a leveling agent, a dehydrating agent, an antioxidant, and the like, as components other than the above described components.

[Method for Manufacturing Negative Electrode Composition]

The negative electrode composition according to the embodiment of the present invention is prepared by mixing a sulfide-based inorganic solid electrolyte, a negative electrode active material, a polymer, and as necessary, other components such as a dispersant, and a conductive auxiliary agent, with various mixers normally used, for example. A mixing method is not particularly limited, and a method for mixing all at once or sequentially may be used.

Firstly, an aqueous dispersion of the polymer and the negative electrode active material are mixed with each other, and water is removed to obtain a composition containing the polymer and the negative electrode active material. The negative electrode composition according to the embodiment of the present invention can also be obtained by mixing this composition with a polymer and other components such as a dispersant, a conductive auxiliary agent, and the like, as necessary, with the above mixer.

The mixing environment is not particularly limited, but may be under dried air, under an inert gas, or the like.

[Negative Electrode Sheet for All-Solid State Secondary Battery]

The negative electrode sheet for an all-solid state secondary battery according to the embodiment of the present invention (also simply referred to as the "negative electrode sheet according to the embodiment of the present invention") may be a negative electrode sheet including a negative electrode active material layer, may be a sheet in which the negative electrode active material layer is formed on a negative electrode current collector, or may be a sheet that has no base material and is formed of the negative electrode active material layer. This negative electrode sheet is generally a sheet having an electrode current collector and a negative electrode active material layer, but an aspect in which a negative electrode current collector, a negative electrode active material layer, and a solid electrolyte layer are provided in this order, and an aspect in which a negative electrode current collector, a negative electrode active material layer, a solid electrolyte layer, and a positive electrode active material layer are provided in this order are also included. The negative electrode sheet according to the embodiment of the present invention may include other layers such as a protective layer and a conductor layer. A layer thickness of each layer constituting the negative electrode sheet according to the embodiment of the present invention is the same as a layer thickness of each layer described in the following description of the all-solid state secondary battery.

The negative electrode active material layer formed of the negative electrode composition according to the embodiment of the present invention is a mixture containing at least a sulfide-based inorganic solid electrolyte and a particulate polymer.

[Method for Manufacturing Negative Electrode Sheet for All-Solid State Secondary Battery]

The method for manufacturing a negative electrode sheet for an all-solid state secondary battery is not particularly limited. The negative electrode sheet for an all-solid state secondary battery can be manufactured by using the negative electrode composition according to the embodiment of the present invention. For example, a method for preparing a negative electrode composition according to the embodiment of the present invention, in which the negative electrode composition contains the particulate polymer as described above, forming a film (coating and drying) by using the obtained negative electrode composition on an electrode current collector (another layer such as a conductor layer may be interposed), and forming a negative electrode active material layer on the electrode current collector (coating dry layer) may be used. In a case where the polymer contained in the negative electrode composition is dissolved in, for example, a dispersant, the polymer can exist in the particle form in the negative electrode active material layer formed by using the negative electrode composition by the above method.

Thereby, a negative electrode sheet for an all-solid state secondary battery including the electrode current collector and the coating dry layer can be produced. Herein, the term "coating dry layer" refers to a layer formed by performing a coating with the negative electrode composition according to the embodiment of the present invention and drying the dispersant (that is, the layer is formed by using the negative electrode composition according to the embodiment of the present invention, and formed of the composition obtained by removing the dispersant from the negative electrode composition according to the embodiment of the present invention). In the coating dry layer, the dispersant may remain in the applied and dried layer as long as the effects of the present invention are not impaired, a residual amount can be, for example, 3% by mass or less.

In the manufacturing method described above, the negative electrode composition according to the embodiment of the present invention is preferably used as a slurry, and the negative electrode composition according to the embodiment of the present invention can be made into a slurry by a known method, as desired. Each step of coating, drying, or the like for the negative electrode composition according to the embodiment of the present invention will be described in the following method for manufacturing an all-solid state secondary battery.

In the method for manufacturing a negative electrode sheet for an all-solid state secondary battery according to the embodiment of the present invention, the coating dry layer obtained as described above can be pressurized. A pressurizing condition and the like will be described in the following description of the method for manufacturing an all-solid state secondary battery.

In addition, in the method for manufacturing the negative electrode sheet for an all-solid state secondary battery according to the embodiment of the present invention, the negative electrode current collector, the protective layer (particularly, a peeling sheet), or the like can also be peeled off

[All-Solid State Secondary Battery]

The all-solid state secondary battery according to the embodiment of the present invention includes a positive electrode active material layer, a negative electrode active material layer facing the positive electrode active material layer, and a solid electrolyte layer disposed between the positive electrode active material layer and the negative electrode active material layer. The positive electrode active material layer is formed on a positive electrode current collector, as necessary, to form a positive electrode. The negative electrode active material layer is formed on a negative electrode current collector, as necessary, to form a negative electrode.

The negative electrode active material layer of the all-solid state secondary battery is formed of the negative electrode composition according to the embodiment of the present invention.

(Positive Electrode Active Material Layer, Solid Electrolyte Layer, and Negative Electrode Active Material Layer)

In the all-solid state secondary battery according to the embodiment of the present invention, as described above, the negative electrode active material layer can be formed of the negative electrode composition according to the embodiment of the present invention or the negative electrode sheet for an all-solid state secondary battery. The formed negative electrode active material layer is preferably the same one as in a solid content of the negative electrode composition with respect to each contained component and the content thereof, unless otherwise specified.

The thickness of the negative electrode active material layer is not particularly limited. In consideration of dimensions of a general all-solid state secondary battery, the thickness of each layer is preferably 5 to 1,000 μm, and more preferably 10 μm or higher and lower than 500 μm.

The positive electrode active material layer and the solid electrolyte layer, which are employed in a general all-solid state secondary battery, can also be employed in the all-solid state secondary battery according to the embodiment of the present invention. For example, the positive electrode active material layers and the solid electrolyte layers described in JP2018-088306A and JP2018-037229A can be employed.

(Housing)

Depending on the application, the all-solid state secondary battery according to the embodiment of the present invention may be used as the all-solid state secondary battery with the above described structure, but, in order to have a dry battery cell form, the all-solid state secondary battery is preferably further enclosed in an appropriate housing. The housing may be made of metal or resin (plastic). In a case where a metal housing is used, examples thereof include an aluminum alloy housing and a stainless steel housing. It is preferable that the metal housing is separately used as the housing for the positive electrode side and the housing for the negative electrode side, and the housing for the positive electrode side and the housing for the negative electrode side are electrically connected to the positive electrode current collector and the negative electrode current collector, respectively. It is preferable that the housing for the positive electrode side and the housing for the negative electrode side are bonded together through a gasket for short-circuit prevention and are thus integrated.

Hereinafter, an all-solid state secondary battery according to a preferred embodiment of the present invention will be described with reference to FIG. 1, but the present invention is not limited thereto.

FIG. 1 is a cross-sectional view schematically illustrating an all-solid state secondary battery (a lithium ion secondary battery) according to a preferred embodiment of the present invention. An all-solid state secondary battery 10 according to the embodiment includes a negative electrode current collector 1, a negative electrode active material layer 2, a solid electrolyte layer 3, a positive electrode active material layer 4, and a positive electrode current collector 5 in this order as viewed from the negative electrode side. The respective layers are in contact with one another and have a laminated structure. In a case where the above described structure is employed, during charging, electrons (e$^-$) are supplied to the negative electrode side, and lithium ions (Li$^+$) are accumulated on the negative electrode side. On the other hand, during discharging, the lithium ions (Li$^+$) accumulated on the negative electrode side return to the positive electrode side, and electrons are supplied to an operation portion 6. In an example illustrated in the drawing, an electric bulb is employed as the operation portion 6 and is lit by discharging.

The negative electrode composition according to the embodiment of the present invention can be preferably used as a material for forming a negative electrode active material layer. The negative electrode sheet for an all-solid state secondary battery according to the embodiment of the present invention is suitable as a negative electrode active material layer.

In a case where an all-solid state secondary battery having the layer constitution shown in FIG. 1 is put into a 2032-type coin case, this all-solid state secondary battery will be referred to as a laminate for an all-solid state secondary battery, and a battery produced by putting this laminate for an all-solid state secondary battery into a 2032-type coin case will be referred to as an all-solid state secondary battery, whereby the laminate for an all-solid state secondary battery and the all-solid state secondary battery will be differentiated in some cases.

(Positive Electrode Active Material Layer, Solid Electrolyte Layer, and Negative Electrode Active Material Layer)

In the all-solid state secondary battery 10, the negative electrode active material layer is formed by using the negative electrode composition according to the embodiment of the present invention or the negative electrode sheet for an all-solid state secondary battery described above.

Each component contained in the positive electrode active material layer 4, the solid electrolyte layer 3, and the negative electrode active material layer 2 may be the same or different from each other.

The positive electrode current collector 5 and the negative electrode current collector 1 are preferably electronic conductors.

In the present invention, any one of the positive electrode current collector or the negative electrode current collector, or both the positive electrode current collector and the negative electrode current collector may be simply referred to as an electrode current collector.

As materials for forming positive electrode current collectors, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and, among these, aluminum and an aluminum alloy are more preferred.

As materials for forming negative electrode current collectors, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the electrode current collector, generally, electrode current collectors having a film sheet-like shape are used, but it is also possible to use net-shaped collectors, punched collectors, compacts of lath bodies, porous bodies, foaming bodies, or molded bodies of fiber groups, and the like.

The thickness of the electrode current collector is not particularly limited, but is preferably 1 to 500 μm. In addition, the surface of the electrode current collector is preferably provided with asperity by means of a surface treatment.

In the present invention, a functional layer, a member, or the like may be appropriately interposed or provided between or outside respective layers of the negative electrode current collector, the negative electrode active material layer, the solid electrolyte layer, the positive electrode active material layer, and the positive electrode current collector. In addition, the respective layers may be composed of a single layer or multiple layers.

[Method for Manufacturing All-Solid State Secondary Battery]

The all-solid state secondary battery according to the embodiment of the present invention is not particularly limited, and can be manufactured through (including) a method for manufacturing a negative electrode composition according to the embodiment of the present invention. Focusing on raw materials used, the solid electrolyte-containing sheet can be manufactured using the negative electrode composition according to the embodiment of the present invention. Specifically, the all-solid state secondary battery can be manufactured by preparing the above described negative electrode composition according to the embodiment of the present invention, using the obtained negative electrode composition, and forming the negative electrode active material layer of the all-solid state secondary battery. As a result, the all-solid state secondary battery having low resistance and excellent cycle characteristics can be manufactured. The method for preparing the negative electrode composition according to the embodiment of the present invention is the same as the above description, and thus will not be repeatedly described.

The all-solid state secondary battery according to the embodiment of the present invention can be manufactured through a method including (through) a step of applying a negative electrode composition according to the embodiment of the present invention onto, for example, a metal foil serving as a negative electrode current collector to form a coating film (form a film).

For example, a positive electrode composition is applied onto a metal foil that is a positive electrode current collector to form a positive electrode active material layer, and a positive electrode sheet for an all-solid state secondary battery is produced. Next, a solid electrolyte composition for forming a solid electrolyte layer is applied onto the positive electrode active material layer to form a solid electrolyte layer. Furthermore, the negative electrode composition according to the embodiment of the present invention is applied onto the solid electrolyte layer to form a negative electrode active material layer. A negative electrode current collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. As necessary, a desired all-solid state secondary battery can be manufactured by enclosing the all-solid state secondary battery in a housing.

In addition, it is also possible to manufacture an all-solid state secondary battery by carrying out the methods of forming the respective layers in a reverse order so as to form a negative electrode active material layer, a solid electrolyte layer, and a positive electrode active material layer on a negative electrode current collector and overlaying a positive electrode current collector thereon.

Examples of other methods include the following methods. That is, a positive electrode sheet for an all-solid state secondary battery is produced as described above. A negative electrode composition according to the embodiment of the present invention is applied onto a metal foil that is a negative electrode current collector to form a negative electrode active material layer, so that a negative electrode sheet for an all-solid state secondary battery is produced. Next, a solid electrolyte composition for forming a solid electrolyte layer is applied on any one active material layer of these sheets as described above to form a solid electrolyte layer. Furthermore, the other one of the positive electrode sheet for an all-solid state secondary battery and the negative electrode sheet for an all-solid state secondary battery is laminated on the solid electrolyte layer so that the solid electrolyte layer and the active material layer come into contact with each other. Thus, the all-solid state secondary battery can be manufactured as described above.

In addition, examples of other methods include the following methods. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, a solid electrolyte composition is applied onto a base material, and thereby a solid electrolyte sheet for an all-solid state secondary battery consisting of a solid electrolyte layer is produced. Furthermore, the positive electrode sheet for an all-solid state secondary battery and the negative electrode sheet for an all-solid state secondary battery are laminated together so as to sandwich the solid electrolyte layer that has been peeled off from the base material. Thus, the all-solid state secondary battery can be manufactured as described above.

A solid electrolyte composition and a positive electrode composition used in the manufacturing of a normal all-solid state secondary battery can be adopted as the solid electrolyte composition and the positive electrode composition, respectively. For example, the solid electrolyte compositions and the positive electrode compositions described in JP2015-088486A can be used.

<Formation of Respective Layers (Film Formation)>

A method for applying a composition used for manufacturing an all-solid state secondary battery is not particularly limited, and can be appropriately selected. Examples thereof include coating (preferably wet coating), spray coating, spin coating, dip coating, slit coating, stripe coating, and bar coating.

In this case, the composition may be subjected to drying treatment after each application is performed, or may be subjected to drying treatment after performing multi-layer coating. The drying temperature is not particularly limited. The lower limit is preferably 30° C. or higher, more preferably 60° C. or higher, even more preferably 80° C. or higher. The upper limit is preferably 300° C. or lower, more preferably 250° C. or lower, and even more preferably 200° C. or lower. The composition is heated at such a temperature range, and a dispersant can be removed, so that a solid state (coating dry layer) can be obtained. Furthermore, it is preferable that the temperature is not too high and each member of the all-solid state secondary battery is not damaged.

It is preferable to pressurize the applied composition, or each layer after producing the all-solid state secondary battery or the all-solid state secondary battery. It is also preferable to pressurize each layer in a laminated state. As a pressurization method, a hydraulic cylinder press or the like can be used. Pressurizing force is not particularly limited, and is generally preferably in a range of 50 to 1500 MPa.

The applied composition may be heated and pressurized simultaneously. The heating temperature is not particularly limited, and is generally in a range of 30° C. to 300° C.

Pressing can be performed at a temperature higher than the glass transition temperature of the inorganic solid electrolyte.

Pressurization may be performed in a state where the applied solvent or the dispersant is dried in advance, or may be performed in a state where the applied solvent or the dispersant remains.

In addition, respective compositions may be applied simultaneously, and application, drying, and press may be performed simultaneously and/or sequentially. The respective compositions are applied to separate base materials, and then may be laminated by transcription.

The atmosphere during pressurization is not particularly limited, and may be in any environment such as in the atmosphere, under the dried air (the dew point: −20° C. or lower), in an inert gas (for example, in an argon gas, in a helium gas, or in a nitrogen gas). Since the inorganic solid electrolyte reacts with moisture, the atmosphere during pressurization is preferably under dried air or in an inert gas.

The pressing time may be a short time (for example, within several hours) at a high pressure or a long time (one day or longer) under the application of an intermediate pressure. In the case of members other than the solid electrolyte-containing sheet, for example, the all-solid state secondary battery, it is also possible to use a restraining device (screw fastening pressure or the like) of the all-solid state secondary battery in order to continuously apply an intermediate pressure.

The pressing pressure may be uniform or different with respect to a pressure-receiving portion such as a sheet surface.

The pressing pressure can be changed depending on the area or film thickness of the pressure-receiving portion. In addition, it is also possible to apply different pressures gradually to the same portion.

A pressing surface may be flat or roughened.

<Initialization>

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state where the pressing pressure is increased and then decreasing the pressure up to a pressure at which the all-solid state secondary battery is ordinarily used.

[Use of All-Solid State Secondary Battery]

The all-solid state secondary battery according to the embodiment of the present invention can be applied to a variety of usages. Application aspects are not particularly limited, and in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer usages include automobiles (electric cars and the like), electric vehicles, motors, lighting equipment, toys, game devices, road conditioners, watches, strobes, cameras, medical devices (pacemakers, hearing aids, shoulder massage devices, and the like), and the like. Furthermore, the all-solid state laminated secondary battery can be used for a variety of military usages and universe usages. In addition, the all-solid state laminated secondary battery can also be combined with solar batteries.

EXAMPLES

Hereinafter, the present invention will be described in more detail on the basis of examples. Meanwhile, the present invention is not interpreted to be limited thereto. "Parts" and "%" that represent compositions in the following examples are mass-based unless otherwise specified.

<Synthesis of Sulfide-Based Inorganic Solid Electrolyte>

—Synthesis of Li—P—S-Based Glass—

As a sulfide-based inorganic solid electrolyte, Li—P—S-based glass was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide ($Li_2S$, manufactured by Aldrich-Sigma, Co. LLC., Purity: >99.98%) (2.42 g) and diphosphorus pentasulfide ($P_2S_5$, manufactured by Aldrich-Sigma, Co. LLC., Purity: >99%) (3.90 g) were respectively weighed, placed into an agate mortar, and mixed using an agate pestle for 5 minutes. The mixing ratio between $Li_2S$ and $P_2S_5$ ($Li_2S:P_2S_5$) was set to 75:25 in terms of molar ratio.

66 g of zirconia beads having a diameter of 5 mm were placed in a 45 mL zirconia container (manufactured by Fritsch Japan Co., Ltd.), the total amount of the mixture of the above described lithium sulfide and diphosphorus pentasulfide was placed therein, and the container was sealed in an argon atmosphere. The container was set in a planetary ball mill P-7 (trade name, manufactured by Fritsch Japan Co., Ltd.), mechanical milling was carried out at a temperature of 25° C. and a rotation speed of 510 rpm for 20 hours, and 6.10 g of yellow powder of a Li—P—S-based glass (hereinafter, in some cases, referred to as LPS) was obtained.

<Preparation of Composition>

The negative electrode composition according to the embodiment of the present invention, and the solid electrolyte composition and the positive electrode composition were prepared as follows.

(Preparation of Negative Electrode Composition (BS-7) (Preparation Method A))

180 zirconia beads having a diameter of 5 mm were placed in a 45 mL zirconia container (manufactured by Fritsch Japan Co., Ltd.), 9.0 g of Li—P—S-based glass synthesized above, 1.3 g of modified PVDF (1) (2500-20 (trade name) manufactured by Arkema S.A.), and 12 g of diisobutyl ketone were added therein. This container was set in a planetary ball mill P-7 (trade name, manufactured by Fritsch Japan Co., Ltd.), and the mixture was stirred at a temperature of 25° C. and a rotation speed of 300 rpm for 2 hours. After stirring, 9.0 g of Si powder (average particle size 1 μm) was added, and 5 g of diisobutyl ketone was added. This container was set in a planetary ball mill P-7 (trade name, manufactured by Fritsch Japan Co., Ltd.), and the mixture was stirred at a temperature of 25° C. and a rotation speed of 150 rpm for 5 minutes. In this manner, a negative electrode composition BS-7 was obtained.

(Preparation of Negative Electrode Composition (BS-8) to (BS-10), (BS-13), (BS-14), (BS-16), (BS-17), and (BT-2) to (BT-6) (Preparation Method A))

In the preparation of the negative electrode composition (BS-7), negative electrode compositions (BS-8) to (BS-10), (BS-13), (BS-14), (BS-16), (BS-17), and (BT-2) to (BT-6) were prepared in the same manner as in the preparation of the negative electrode composition (BS-7), except that compositions shown in Table 1 below were employed. Regarding the negative electrode composition (BT-2), diisobutyl ketone was replaced with isobutyronitrile (manufactured by Aldrich-Sigma, Co. LLC.).

(Preparation of Negative Electrode Composition (BS-1) (Preparation Method B))

12.0 g of Si powder (average particle size 1 μm) and 173 g of an aqueous dispersion of a pre-prepared polymer (solid content of 1% by mass) were placed into a 200 mL eggplant flask, and the mixture was stirred by using a rotor at a temperature of 25° C. and a rotation speed of 700 rpm for 1 hour. Thereafter, water was removed by an evaporator to obtain a composition containing a polymer and an active material. This composition was vacuum dried at 100° C. for 24 hours to obtain a dried composition.

180 zirconia beads having a diameter of 5 mm were placed in a 45 mL zirconia container (manufactured by Fritsch Japan Co., Ltd.), 9.0 g of Li—P—S-based glass, and 10 g of diisobutyl ketone were added therein. This container was set in a planetary ball mill P-7 (trade name, manufactured by Fritsch Japan Co., Ltd.), and the mixture was stirred at a temperature of 25° C. and a rotation speed of 300 rpm for 2 hours. After stirring, 10.3 g of the above composition and 0.9 g of acetylene black were added, and 5 g of diisobutyl ketone was added. This container was set in a planetary ball mill P-7 (trade name, manufactured by Fritsch Japan Co., Ltd.), and the mixture was stirred at a temperature of 25° C. and a rotation speed of 150 rpm for 5 minutes. In this manner, a negative electrode composition (BS-1) was obtained. This negative electrode composition is a dispersion liquid (slurry) formed by dispersing the sulfide-based inorganic solid electrolyte, the negative electrode active material, and the polymer.

(Preparation of Negative Electrode Composition (BS-2) to (BS-6), (BS-11), (BS-12), (BS-15), (BT-1), (BT-7), and (BT-10) (Preparation Method B))

In the preparation of the negative electrode composition (BS-1), negative electrode compositions (BS-2) to (BS-6), (BS-11), (BS-12), (BS-15), (BT-1), (BT-7), and (BT-10) were prepared in the same manner as in the preparation of the negative electrode composition (BS-1), except that compositions shown in Table 1 below were employed.

(Preparation of Negative Electrode Composition (BT-8) and (BT-9) (Preparation Method B))

12.0 g of graphite active material and 281 g of an aqueous dispersion of a pre-prepared polymer (solid content of 1% by mass) were placed into a 200 mL eggplant flask, and the mixture was stirred by using a rotor at a temperature of 25° C. and a rotation speed of 700 rpm for 1 hour. Thereafter, water was removed by an evaporator to obtain a composition containing a polymer and an active material. This composition was vacuum dried at 100° C. for 24 hours to obtain a dried composition.

180 zirconia beads having a diameter of 5 mm were placed in a 45 mL zirconia container (manufactured by Fritsch Japan Co., Ltd.), 9.0 g of Li—P—S-based glass, and 10 g of diisobutyl ketone were added therein. This container was set in a planetary ball mill P-7 (trade name, manufactured by Fritsch Japan Co., Ltd.), and the mixture was stirred at a temperature of 25° C. and a rotation speed of 300 rpm for 2 hours. After stirring, 11.2 g of the above composition and 0.95 g of acetylene black were added, and 5 g of diisobutyl ketone was added. This container was set in a planetary ball mill P-7 (trade name, manufactured by Fritsch Japan Co., Ltd.), and the mixture was stirred at a temperature of 25° C. and a rotation speed of 150 rpm for 5 minutes. In this manner, a negative electrode composition (BT-8) was obtained.

In the preparation of the negative electrode composition (BT-8), a negative electrode composition (BT-9) was prepared in the same manner as in the preparation of the negative electrode composition (BT-8), except that compositions shown in Table 1 below were employed.

(Preparation of Negative Electrode Composition (BS-21) to (BS-23), (BT-21), and (BT-22) (Preparation Method B))

In the preparation of the negative electrode composition (BS-1), negative electrode compositions (BS-21) to (BS-23), (BT-21), and (BT-22) were prepared in the same manner as in the preparation of the negative electrode composition (BS-1), except that compositions shown in Table 2 below were employed.

(Preparation of Solid Electrolyte Composition)

180 zirconia beads having a diameter of 5 mm were placed in a 45 mL zirconia container (manufactured by Fritsch Japan Co., Ltd.), 9.0 g of Li—P—S-based glass synthesized above, 0.4 g of PVdF-HFP (manufactured by Arkema S.A.), and 11 g of diisobutyl ketone were added therein. This container was set in a planetary ball mill P-7 (trade name, manufactured by Fritsch Japan Co., Ltd.), and the mixture was continuously stirred at a temperature of 25° C. and a rotation speed of 300 rpm for 2 hours. In this way, the solid electrolyte composition was prepared.

(Preparation of Positive Electrode Composition)

180 zirconia beads having a diameter of 5 mm were placed in a 45 mL zirconia container (manufactured by Fritsch Japan Co., Ltd.), 9.0 g of Li—P—S-based glass synthesized above, 0.4 g of PVdF-HFP (copolymer of vinylidene fluoride and hexafluoropropylene) (manufactured by Arkema S.A.), and 15 g of toluene were added therein. This container was set in a planetary ball mill P-7 (trade name, manufactured by Fritsch Japan Co., Ltd.), and the mixture was continuously stirred at a temperature of 25° C. and a rotation speed of 300 rpm for 2 hours. In this way, the solid electrolyte composition was prepared. 6.1 g of this solid electrolyte composition, 3.5 g of NMC, 0.3 g of acetylene black, and 12 g of toluene were placed into a 45 mL zirconia container (manufactured by Fritsch Japan Co., Ltd.) together with 180 zirconia beads having a diameter of 5 mm. This container was set in a planetary ball mill P-7, and the mixture was continuously stirred at a temperature of 25° C. and a rotation speed of 100 rpm for 5 minutes. In this way, the positive electrode composition was prepared.

<Production of All-Solid State Secondary Battery>

Figure 2:
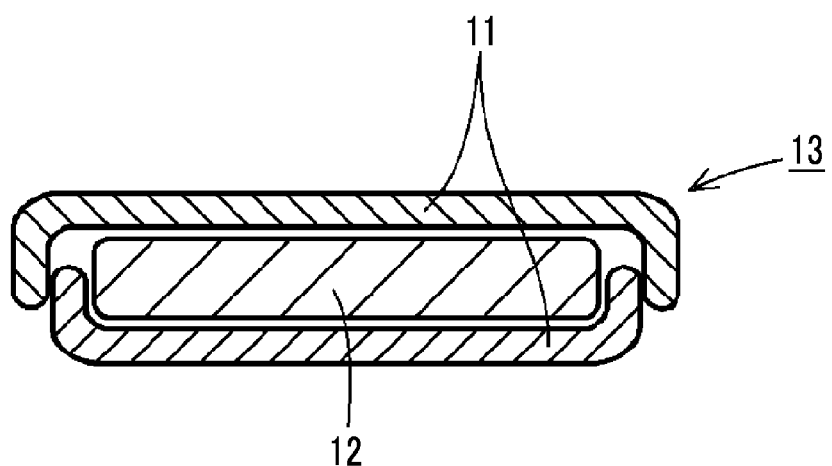
FIG. 2 is a longitudinal cross-sectional view schematically illustrating an all-solid state secondary battery (coin battery) produced in Example.

The all-solid state secondary battery shown in FIG. 2 was produced as follows.

(Production of All-Solid State Secondary Battery (BS-1))

An all-solid state secondary battery was produced in a dry room with a dew point of −50° C. or lower as follows.

A positive electrode composition was applied to an aluminum foil having a thickness of 20 μm using an applicator (trade name: SA-201 Baker-type applicator, manufactured by Tester Sangyo Co., Ltd.) and was dried at 120° C. for 1 hour, so that a mass after drying was 21 mg per 1 cm². Thereafter, the dried result is pressurized (180 MPa for 1 minute) using a heat pressing machine while heating (120° C.) to produce a positive electrode sheet for an all-solid state secondary battery having a laminated constitution including a positive electrode active material layer and an aluminum foil.

A negative electrode sheet for an all-solid state secondary battery according to the embodiment of the present invention was produced in the same manner as the production of the positive electrode sheet for an all-solid state secondary battery as follows.

The negative electrode composition (BS-1) was applied on a stainless steel foil having a thickness of 15 μm using an applicator and was dried at 120° C. for 1 hour condition, so that a mass after drying was 2.9 mg per 1 cm². Thereafter, the dried result is pressurized (180 MPa for 1 minute) using a heat pressing machine while heating (120° C.) to produce a negative electrode sheet for an all-solid state secondary battery according to the embodiment of the present invention, which has a laminated constitution including a negative electrode active material layer and a stainless steel foil.

The solid electrolyte composition prepared above was applied onto the negative electrode active material layer of the negative electrode sheet for an all-solid state secondary battery by the above described Baker type applicator, heated at 80° C. for 1 hour, and then further heated at 100° C. for 1 hour to form a solid electrolyte layer.

The positive electrode sheet for an all-solid state secondary battery was overlapped on the negative electrode sheet for an all-solid state secondary battery so that the positive electrode active material layer and the solid electrolyte layer were in contact with each other, and the entire laminate was pressurized at 500 MPa for 1 minute to obtain a laminate for an all-solid state secondary battery having the layer constitution as shown in FIG. 1. A thickness of the positive electrode active material layer was 75 gm, a thickness of the solid electrolyte layer was 100 μm, and a thickness of the negative electrode active material layer was 25 μm.

This laminate was cut out into a disk shape having a diameter of 10 mm. An all-solid state secondary battery laminate 12 having a diameter of 10 mm is put in a stainless steel 2032-type coin case 11 in which a spacer and a washer (not shown in FIG. 2) are incorporated, and the 2032-type coin case 11 is crimped (restraint pressure: 0.1 MPa) to produce an all-solid state secondary battery 13 shown in FIG. 2.

(Production of all-solid state secondary batteries (BS-2) to (BS-17), (BT-1) to (BT-7), and (BT-10))

In the production of an all-solid state secondary battery (BS-1), all-solid state secondary batteries (BS-2) to (BS-17), (BT-1) to (BT-7), and (BT-10) were produced in the same manner as the all-solid state secondary battery (BS-1), except that the negative electrode compositions (BS-2) to (BS-17), (BT-1) to (BT-7), and (BT-10) were used instead of the negative electrode composition (BS-1).

(Production of All-Aolid State Secondary Batteries (BT-8) and (BT-9))

In the production of the negative electrode sheet of the all-solid state secondary battery (BS-1), an all-solid state secondary battery (BT-8) was produced in the same manner as the all-solid state secondary battery (BS-1), except that a stainless foil was applied by the negative electrode composition (BT-8) instead of the negative electrode composition (BS-1) so that a mass after drying was 14 mg per 1 cm².

In the production of the all-solid state secondary battery (BT-8), an all-solid state secondary battery (BT-9) was produced in the same manner as the all-solid state secondary battery (BT-8), except that the negative electrode composition (BT-9) was used instead of the negative electrode composition (BT-8).

(Production of All-Solid State Secondary Batteries (BS-21) to (BS-23), (BT-21), and (BT-22))

In the production of the all-solid state secondary battery (BS-1), an all-solid state secondary battery (BS-21) was produced in the same manner as the all-solid state secondary battery (BS-1), except that the negative electrode composition (BS-21) was used instead of the negative electrode composition (BS-1), the positive electrode composition was applied on an aluminum foil so that a mass after drying was 7 mg per 1 cm², and the negative electrode composition (BS-21) was applied on a stainless foil so that a mass after drying was 0.97 mg per 1 cm².

In the production of the all-solid state secondary battery (BS-21), all-solid state secondary batteries (BS-22), (BS-23), (BT-21), and (BT-22) were produced in the same manner as the all-solid state secondary battery (BS-21), except that the negative electrode compositions (BS-22), (BS-23), (BT-21), and (BT-22) were used instead of the negative electrode composition (BS-21).

<Test>

A cycle characteristic test was conducted for the all-solid state secondary batteries (BS-1) to (BS-17), (BT-1) to (BT-10), (BS-21) to (BS-23), (BT-21), and (BT-22), as follows, and 1C discharge capacity was measured. Evaluation results are shown in Tables 1 and 2 below.

(Cycle Characteristics)

By using the all-solid state secondary batteries produced above, one charging and discharging of 4.3 V to 3.0 V was performed (initialized) under conditions of a charging current value of 0.13 mA and a discharging current value of 0.13 mA in an environment of 30° C.

Thereafter, as a cycle test, charging and discharging of 4.3 V to 3.0 V was repeated under a condition of a charging and discharging current value of 0.39 mA in an environment of 25° C. One charging and discharging is one cycle.

The discharge capacity of 1st cycle and the discharge capacity of 20th cycle were measured, a discharge capacity retention rate was measured by the following expression, and the cycle characteristics were evaluated by applying the discharge capacity retention rate to the following evaluation criteria. "A to C" are acceptable in this test.

Discharge capacity retention rate (%)=(Discharge capacity in 20th cycle/Discharge capacity in 1st cycle)×100

—Evaluation Criteria—
A: 70% or higher and 100%
B: 60% or higher and lower than 70%
C: 50% or higher and lower than 60%
D: 35% or higher and lower than 50%
E: lower than 35%

(1C Discharge Capacity (Resistance Evaluation))

By using the all-solid state secondary batteries produced above, one charging and discharging of 4.3 V to 3.0 V was performed (initialized) under conditions of a charging current value of 0.13 mA and a discharging current value of 0.13 mA in an environment of 30° C.

Thereafter, as a cycle test, the battery was charged to 4.3 V under a condition of a charging current value of 0.13 mA in an environment of 25° C., and then was discharged to 3.0 V at a discharging current value of 1.3 mA (1st cycle). Charging and discharging were performed again under the same conditions (2nd cycle).

The discharge capacity of 1st cycle and the discharge capacity of 2nd cycle were measured and evaluated according to the following evaluation criteria. "A to C" are acceptable in this test.

Discharge capacity retention rate (%)=(Discharge capacity in 2nd cycle/Discharge capacity in 1st cycle)×100

—Evaluation Criteria—
A: 50% or higher and 100%
B: 40% or higher and lower than 50%
C: 35% or higher and lower than 40%
D: 20% or higher and lower than 35%
E: lower than 20%

It can be said that the larger the discharge capacity retention rate in this test, the larger the capacity at a high current value, and therefore the lower the resistance of the all-solid state secondary battery.

<Calculation Method>

An adsorption rate of the polymer to the negative electrode active material containing silicon atoms or tin atoms, and an adsorption rate of the polymer to the sulfide-based inorganic solid electrolyte were calculated as follows. A modulus of elasticity of the polymer was calculated in accordance with JIS K 7161 (2014). An aspect ratio of the particles constituting the conductive auxiliary agent was calculated.

(Adsorption Rate)

0.5 mg of the polymer and 1 g of the dispersant (diisobutyl ketone contained in the above composition) contained in the negative electrode composition were placed in a 10 mL test tube (diameter of 10 mm, length of 120 mm), and the mixture was stirred at 25° C. for 15 minutes with a test tube mixer (Delta Mixer Se-04 (trade name) manufactured by TIETECH Co., Ltd.). Subsequently, the test tube was set in a centrifugal machine and centrifuged at 5000 rpm for 20 minutes, and a supernatant solution (80% of the total amount of liquid from a liquid level toward a closed portion) was obtained. The mass of this supernatant solution is denoted by A. After distilling off the dispersant in the supernatant solution, the mass of the polymer contained in the supernatant solution was measured. The mass of this polymer is denoted by B.

Similarly, 0.5 mg of the polymer and 1 g of the diisobutyl ketone were placed in a 10 mL test tube (diameter and length are the same as above), and the resultant mixture was stirred with the test tube mixer at 25° C. for 15 minutes. 50 mg of the negative electrode active material containing silicon atoms or tin atoms was added to the test tube, and the resultant mixture was stirred with the test tube mixer at 25° C. for 15 minutes. Subsequently, the test tube was set in the centrifugal machine, and centrifuged at 5000 rpm for 20 minutes. The precipitated negative electrode active material and the polymer adsorbed on the negative electrode active material were separated from the supernatant solution (80% of the total amount of liquid from a liquid level toward a closed portion). The mass of this supernatant solution is denoted by C. After distilling off the dispersant in the supernatant solution, the mass of the polymer contained in the supernatant solution was measured. The mass of this polymer is denoted by D. The adsorption rate of the polymer with respect to the negative electrode active material containing silicon atoms or tin atoms was calculated from the following expression.

$$100-[\{(D/C)\div(B/A)\}\times 100] \ (\%)$$

In the calculation of the adsorption rate of the polymer with respect to the negative electrode active material containing silicon atoms or tin atoms, the adsorption rate of the polymer with respect to the sulfide-based inorganic solid electrolyte was calculated in the same manner as the adsorption rate of the polymer with respect to the negative electrode active material containing silicon atoms or tin atoms described above, except that the sulfide-based inorganic solid electrolyte was used instead of the negative electrode active material containing silicon atoms or tin atoms.

(Modulus of Elasticity (Tensile Modulus of Elasticity))

A test piece described in "Plastic-How to determine tensile properties" of JIS K 7161 (2014) was produced from a polymer solution, and a tensile modulus of elasticity described in this standard was determined.

Specifically, the polymer was dissolved in, for example, methyl ethyl ketone (MEK), N-methylpyrrolidone (NMP), or the like to produce a cast film having a thickness of about 200 μm. This cast film was cut to a size of 10 mm×20 mm and set in a tensile testing machine so that the distance between chucks (distance between grippers) was 10 mm, and stress and strain line evaluations were performed to obtain a modulus of elasticity.

(Aspect Ratio Calculation Method)

An aspect ratio of the particles constituting the conductive auxiliary agent was calculated as follows.

SEM images of three random views randomly selected and captured using a scanning electron microscope (SEM) (XL30 manufactured by Koninklijke Philips N.V. (trade name)) at a magnification of 1000 to 3000 times were converted to bitmap (BMP) files, images of 50 particles of the conductive auxiliary agent were imported using "A JOUKUN" which was an integrated application of IP-1000PC (trade name) manufactured by Asahi Kasei Engineering Corporation, the maximum value and the minimum value of the lengths of the respective particles were scanned in a state in which the particles were visible in the images without being overlapped, and the aspect ratio was calculated in the following order.

Among the maximum lengths (major axis lengths) of the 50 particles, the average value (A) of 40 maximum values excluding the top five maximum values and bottom five maximum values was obtained. Next, among the minimum lengths (minor axis lengths) of the 50 particles, the average value (B) of 40 minimum values excluding the top five minimum values and bottom five minimum values was obtained. The average value (A) was divided by the average value (B), thereby calculating the aspect ratio.

TABLE 1

| | SE | Content (% by mass) | Negative electrode active material | Content (% by mass) | Polymer | Carbon atom content in specific bond or group | Modulus of elasticity | State | Electrolyte adsorption rate (%) |
|---|---|---|---|---|---|---|---|---|---|
| BS-1 | LPS | 44.55 | Si | 44.55 | PVDF | <1 | 250 MPa | Particle | <1 |
| BS-2 | LPS | 45 | Si | 45 | PVDF | <1 | 250 MPa | Particle | <1 |
| BS-3 | LPS | 37.75 | Si | 37.75 | PVDF | <1 | 250 MPa | Particle | <1 |
| BS-5 | LPS | 42.75 | Si | 42.75 | PVDF | <1 | 250 MPa | Particle | <1 |
| BS-6 | LPS | 42.75 | Si | 42.75 | Modified PVDF (1) | 3 | 200 MPa | Particle | <1 |
| BS-7 | LPS | 46.6 | Si | 46.6 | Modified PVDF (1) | 3 | 200 MPa | Particle | <1 |
| BS-8 | LPS | 42.75 | Si | 42.75 | Polyimide | 8 | 800 MPa | Particle | 6 |
| BS-9 | LPS | 42.75 | Si | 42.75 | Polyimide | 20 | 800 MPa | Particle | 8 |
| BS-10 | LPS | 42.75 | SiO | 42.75 | Polyimide | 8 | 800 MPa | Particle | 6 |
| BS-11 | LPS | 42.75 | Sn | 42.75 | PVDF | <1 | 250 MPa | Particle | <1 |
| BS-12 | LPS | 42.75 | Sn | 42.75 | PVDF | <1 | 250 MPa | Particle | <1 |

TABLE 1-continued

| | SE | Content (% by mass) | Negative electrode active material | Content (% by mass) | Polymer | Carbon atom content in specific bond or group | Modulus of elasticity | State | Electrolyte adsorption rate (%) |
|---|---|---|---|---|---|---|---|---|---|
| BS-13 | LPS | 42.75 | Sn | 42.75 | Modified PVDF (1) | 3 | 200 MPa | Particle | <1 |
| BS-14 | LPS | 42.75 | Sn | 42.75 | Polyimide | 20 | 800 MPa | Particle | 8 |
| BS-15 | LPS | 42.75 | LaSi | 42.75 | PVDF | <1 | 250 MPa | Particle | <1 |
| BS-16 | LPS | 46.75 | Si | 46.75 | PVDF | <1 | 250 MPa | Particle | <1 |
| BS-17 | LPS | 32.75 | Si | 32.75 | PVDF | <1 | 250 MPa | Particle | <1 |
| BT-1 | LPS | 42.75 | Si | 42.75 | HSBR (1) | <1 | 5 MPa | Particle | <1 |
| BT-2 | LPS | 42.75 | Si | 42.75 | HSBR (2) | <1 | 5 MPa | Coating | <1 |
| BT-3 | LPS | 42.75 | Si | 42.75 | Modified PVDF (2) | 3 | 250 MPa | Coating | <1 |
| BT-4 | LPS | 42.75 | Si | 42.75 | Acrylic resin | 30 | 20 MPa | Particle | 70 |
| BT-5 | LPS | 42.75 | Si | 42.75 | Hydrocarbon resin | <1 | 10 MPa | Particle | <1 |
| BT-6 | LPS | 42.75 | Sn | 42.75 | HSBR (2) | <1 | 5 MPa | Coating | <1 |
| BT-7 | LPS | 42.75 | Si | 42.75 | PES | 20 | 1100 MPa | Particle | 8 |
| BT-8 | LPS | 42.55 | Graphite | 42.55 | PVDF | <1 | 250 MPa | Particle | <1 |
| BT-9 | LPS | 42.55 | Graphite | 42.55 | HSBR (1) | <1 | 5 MPa | Particle | <1 |
| BT-10 | LPS | 42.75 | Si | 42.75 | PTFE | 0 | 250 MPa | Particle | 0 |

| | Active material adsorption rate (%) | Content (% by mass) | Conductive auxiliary agent | Aspect ratio | Content (% by mass) | Composition preparation method | Cycle characteristics | Resistance |
|---|---|---|---|---|---|---|---|---|
| BS-1 | <5 | 6.44 | AB | 1.1 | 4.46 | B | B | A |
| BS-2 | <5 | 10 | — | — | — | B | B | B |
| BS-3 | <5 | 20 | AB | 1.1 | 4.5 | B | A | C |
| BS-5 | <5 | 10 | VGCF | 100 | 4.5 | B | A | A |
| BS-6 | 7 | 10 | VGCF | 100 | 4.5 | B | A | A |
| BS-7 | 7 | 6.8 | — | — | — | A | B | B |
| BS-8 | 8 | 10 | VGCF | 100 | 4.5 | A | A | B |
| BS-9 | 8 | 10 | VGCF | 100 | 4.5 | A | B | C |
| BS-10 | 8 | 10 | VGCF | 100 | 4.5 | A | A | C |
| BS-11 | <5 | 10 | AB | 1.1 | 4.5 | B | B | C |
| BS-12 | <5 | 10 | VGCF | 100 | 4.5 | B | A | A |
| BS-13 | 7 | 10 | VGCF | 100 | 4.5 | A | A | B |
| BS-14 | 8 | 10 | VGCF | 100 | 4.5 | A | B | B |
| BS-15 | 8 | 10 | VGCF | 100 | 4.5 | B | C | C |
| BS-16 | <5 | 2 | AB | 1.1 | 4.5 | A | C | B |
| BS-17 | <5 | 30 | AB | 1.1 | 4.5 | A | C | C |
| BT-1 | <5 | 10 | AB | 1.1 | 4.5 | B | E | E |
| BT-2 | <5 | 10 | AB | 1.1 | 4.5 | A | E | E |
| BT-3 | <5 | 10 | AB | 1.1 | 4.5 | A | D | C |
| BT-4 | 10 | 10 | VGCF | 100 | 4.5 | A | D | B |
| BT-5 | <5 | 10 | VGGF | 100 | 4.5 | A | D | B |
| BT-6 | <5 | 10 | AB | 1.1 | 4.5 | A | E | E |
| BT-7 | 7 | 10 | AB | 1.1 | 4.5 | B | D | C |
| BT-8 | <5 | 10.4 | VGCF | 100 | 4.5 | B | A | D |
| BT-9 | <5 | 10.4 | VGCF | 100 | 4.5 | B | A | E |
| BT-10 | 0 | 10 | VGCF | 100 | 4.5 | B | D | D |

TABLE 2

| | SE | Content (% by mass) | Negative electrode active material | Content (% by mass) | Polymer | Carbon atom content in specific bond or group | Modulus of elasticity | State | Electrolyte adsorption rate (%) |
|---|---|---|---|---|---|---|---|---|---|
| BS-21 | LPS | 42.75 | Si | 42.75 | PVDF | >1 | 250 MPa | Particle | <1 |
| BS-22 | LPS | 42.75 | Si | 42.75 | PVDF | >1 | 250 MPa | Particle | <1 |
| BS-23 | LPS | 45 | Si | 45 | PVDF | >1 | 250 MPa | Particle | <1 |
| BT-21 | LPS | 42.75 | Si | 42.75 | HSBR (1) | >1 | 5 MPa | Particle | <1 |
| BT-22 | LPS | 45 | Si | 45 | HSBR (1) | >1 | 5 MPa | Particle | <1 |

| | Active material adsorption rate (%) | Content (% by mass) | Conductive auxiliary agent | Aspect ratio | Content (% by mass) | Composition preparation method | Cycle characteristics | Resistance |
|---|---|---|---|---|---|---|---|---|
| BS-21 | <5 | 10 | AB | 1.1 | 4.5 | B | A | B |
| BS-22 | <5 | 10 | VGCF | 100 | 4.5 | B | A | A |
| BS-23 | <5 | 10 | — | — | — | B | C | C |
| BT-21 | <5 | 10 | AB | 1.1 | 4.5 | B | E | D |
| BT-22 | <5 | 10 | — | — | — | B | E | E |

<Notes in Table>

SE: Sulfide-based inorganic solid electrolyte

PVDF: Trepearl (registered trademark), polyvinylidene fluoride aqueous dispersion (manufactured by TORAY INDUSTRIES, INC.), average particle size of 1400 nm Modified PVDF (1): manufactured by Arkema S.A. (model number 2500-20), average particle size of 2000 nm Modified PVDF (2): manufactured by Arkema S.A. (model number 2750-20)

Polyimide: Polyimide powder UIP-S (trade name, manufactured by Ube Industries, Ltd.), average particle size of 1000 nm HSBR (1): BM-400 (trade name, manufactured by ZEON Corporation) aqueous dispersion of HSBR particles, average particle size of 2000 nm HSBR (2): DYNARON 1321P (trade name, manufactured by JSR Corporation)

Acrylic resin: Techpolymer MBX (trade name, manufactured by Sekisui Kasei Co., Ltd.), average particle size of 1500 nm Hydrocarbon resin: Flow Beads (trade name, manufactured by SUMITOMO SEIKA CHEMICALS CO., LTD.), average particle size of 2500 nm PES: Trepearl (registered trademark), polyether sulfone aqueous dispersion manufactured by TORAY INDUSTRIES, INC., average particle size of 3500 nm.

PTFE: Microdispers 200 (manufactured by TECHNO CHEMICAL corporation), average particle size of 200 to 500 nm (The average particle size means an average particle size in the composition for the polymer existing in the particle form in the negative electrode composition. On the other hand, the average particle size means an average particle size in the negative electrode active material layer for the polymer that is dissolved in the negative electrode composition and exists in the particle form in the negative electrode composition.)

Carbon atom content in specific bond or group: The carbon atom content in a specific bond or group represents a carbon atom content of an ester bond, an amide bond, a carboxyl group, a carbonyl group, a urethane bond, and an imide bond each of which contains the above described polymer in a total carbon atom content of the polymer.

State: The state represents a shape of the polymer in the negative electrode active material layer.

Particles: The particles represent that the polymer is dispersed or dissolved in the negative electrode composition in the particle form, the negative electrode active material layer is formed using this composition, and the polymer exists in the particle form in the negative electrode active material layer.

Coating: The coating represents that the polymer is dissolved in the negative electrode composition, the negative electrode active material layer is formed by using this composition, and the polymer does not exist in the particle form in the negative electrode active material layer.

AB: Acetylene black

VGCF: Vapor grown carbon fiber

An "electrolyte adsorption rate (adsorption rate of polymer to sulfide-based inorganic solid electrolyte (%))" is 0.1% or more for all polymers except PTFE, and an "active material adsorption rate (adsorption rate of polymer to active material (%))" was 0.1% or more for all polymers except PTFE.

-:"-" means that the corresponding component or the like is not contained.

As is clear from Table 1, even though the negative electrode active material containing silicon atoms or tin atoms is used, the modulus of elasticity of the polymer of the all-solid state secondary battery produced by using the negative electrode composition which does not satisfy the specification of the present invention was unacceptable in the cycle characteristics (BT-1, BT-2, and BT-5 to BT-7).

The all-solid state secondary battery in which the polymer existed in a coated state in the negative electrode active material was unacceptable in the cycle characteristics (BT-3).

Both the all-solid state secondary battery produced using the polymer having the adsorption capacity too large with respect to the sulfide-based inorganic solid electrolyte and the all-solid state secondary battery produced using the polymer that did not adsorb at all to the sulfide-based inorganic solid electrolyte were unacceptable in the cycle characteristics (BT-4 and BT-10).

Even though the polymer specified in the present invention was used, the all-solid state secondary battery produced by using graphite as the negative electrode active material was unacceptable in resistance (BT-8).

In the production of the all-solid state secondary batteries (BT-8) and (BT-9), an all-solid state secondary battery was produced in the same manner as the all-solid state secondary batteries (BT-8) and (BT-9), except that each mass of the negative electrode compositions (BT-8) and (BT-9) after drying was 2.9 mg per 1 cm$^2$. In a case where each of these all-solid state secondary batteries was operated, the discharge capacity was 30% at initialization. It is considered that, at the same basis weight, lithium ions were precipitated as lithium metal at the negative electrode, resulting in side reactions and irreversible lithium.

On the other hand, the all-solid state secondary battery produced by using the negative electrode composition satisfying the specifications of the present invention was acceptable in both the cycle characteristics and resistance. For example, it was found from the comparison of the results of BS-5 and BT-8 that the negative electrode composition according to the embodiment of the present invention can improve the performance of the all-solid state secondary battery by utilizing the characteristics of the negative electrode active material containing silicon atoms or tin atoms.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

EXPLANATION OF REFERENCES

1: negative electrode current collector
2: negative electrode active material layer
3: solid electrolyte layer
4: positive electrode active material layer
5: positive electrode current collector
6: operation portion
10: all-solid state secondary battery
11: 2032-type coin case
12: laminate for all-solid state secondary battery
13: all-solid state secondary battery

What is claimed is:

1. A negative electrode active material layer formed of a negative electrode composition, wherein the negative electrode composition comprises:

a sulfide-based inorganic solid electrolyte;
a negative electrode active material containing a silicon atom or a tin atom; and
a polymer,
wherein the polymer has substantially no adsorption capacity to the negative electrode active material and the sulfide-based inorganic solid electrolyte, and a modulus of elasticity of the polymer measured in accordance with JIS K 7161 (2014) is 100 MPa or higher and 1000 MPa or lower, and
the polymer is contained in the negative electrode active material layer in a particle form,
and wherein a content of the polymer in a total solid component is 5% to 20% by mass.

2. The negative electrode active material layer according to claim 1, wherein in the polymer, a carbon atom content of an ester bond, an amide bond, a carboxyl group, a carbonyl group, a urethane bond, and an imide bond in a total carbon atom content of the polymer is 10% by mol or less.

3. The negative electrode active material layer according to claim 1, further comprising an electron conductive carbon material in the negative electrode composition.

4. The negative electrode active material layer according to claim 3, wherein the electron conductive carbon material has an aspect ratio of 3 or more.

5. The negative electrode active material layer according to claim 1, wherein the negative electrode active material contains a silicon atom.

6. The negative electrode active material layer according to claim 5, wherein a content of silicon atom in all atoms constituting the negative electrode active material is 50% by mol or more.

7. A negative electrode sheet for an all-solid state secondary battery, comprising the negative electrode active material layer according to claim 1.

8. An all-solid state secondary battery comprising, in the following order:
a positive electrode active material layer;
a solid electrolyte layer; and
the negative electrode active material layer according to claim 1.

9. A method for manufacturing a negative electrode sheet for an all-solid state secondary battery using the negative electrode active material layer according to claim 1, comprising:
performing a coating with the negative electrode composition.

10. A method for manufacturing an all-solid state secondary battery, comprising:
obtaining a negative electrode sheet for an all-solid state secondary battery by the manufacturing method according to claim 9; and
manufacturing an all-solid state secondary battery using the negative electrode sheet for an all-solid state secondary battery.

11. The negative electrode active material layer according to claim 1, wherein an aspect ratio of the polymer is 1 to 100.

12. The negative electrode active material layer according to claim 1, wherein an average particle size of the polymer is in a range of 1000 nm to 2000 nm.

13. The negative electrode active material layer according to claim 1, wherein an aspect ratio of the polymer is 1 to 100, and an average particle size of the polymer is in a range of 1000 nm to 2000 nm.

* * * * *